United States Patent
Kotecha

(10) Patent No.: US 7,813,455 B2
(45) Date of Patent: Oct. 12, 2010

(54) DECODING MIMO SPACE TIME CODE SYMBOL-PAIRS

(75) Inventor: Jayesh H. Kotecha, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 894 days.

(21) Appl. No.: 11/562,557

(22) Filed: Nov. 22, 2006

(65) Prior Publication Data

US 2008/0118008 A1    May 22, 2008

(51) Int. Cl.
*H04L 27/06* (2006.01)
(52) U.S. Cl. ............. 375/340; 375/267; 375/299; 375/347; 455/101; 455/132; 455/296; 455/500; 370/334
(58) Field of Classification Search ........... 375/340–41, 375/267, 299, 347; 455/101, 132, 296, 500; 370/334
See application file for complete search history.

(56) References Cited

U.S. PATENT DOCUMENTS 7,505,527 B2 * 3/2009 Hwang et al. ............... 375/267
2004/0228423 A1 11/2004 Gueguen ..................... 375/341
2007/0297528 A1 * 12/2007 Feder et al. ................. 375/267

FOREIGN PATENT DOCUMENTS

EP    1453262    1/2004

OTHER PUBLICATIONS

B. Hassibi, "An Efficient Square-Root Algorithm for BLAST," Proceedings of the 2000 IEEE International Conference on Acoustics, Speech and Signal Processing,, Jan. 27, 2000.

* cited by examiner

*Primary Examiner*—David C Payne
*Assistant Examiner*—Leon Flores
(74) *Attorney, Agent, or Firm*—Hamilton & Terrile, LLP; Kent B. Chambers

(57) ABSTRACT

A MIMO wireless communication system and method reduces the number of recursive operations when decoding received data symbols by decoding the data symbols in pairs rather than on a per symbol basis. Decoding in pairs is facilitated by the determination that errors between selected pairs of data symbols are uncorrelated and identically distributed with a determined variance. Additionally, the system and method can order the pairs and provide decoding rules that result in an insignificant loss of performance for a wide range of signal-to-noise ratios (SNRs). Furthermore, the system and method exploit the structure of the error covariance matrix to reduce computational demands.

28 Claims, 15 Drawing Sheets

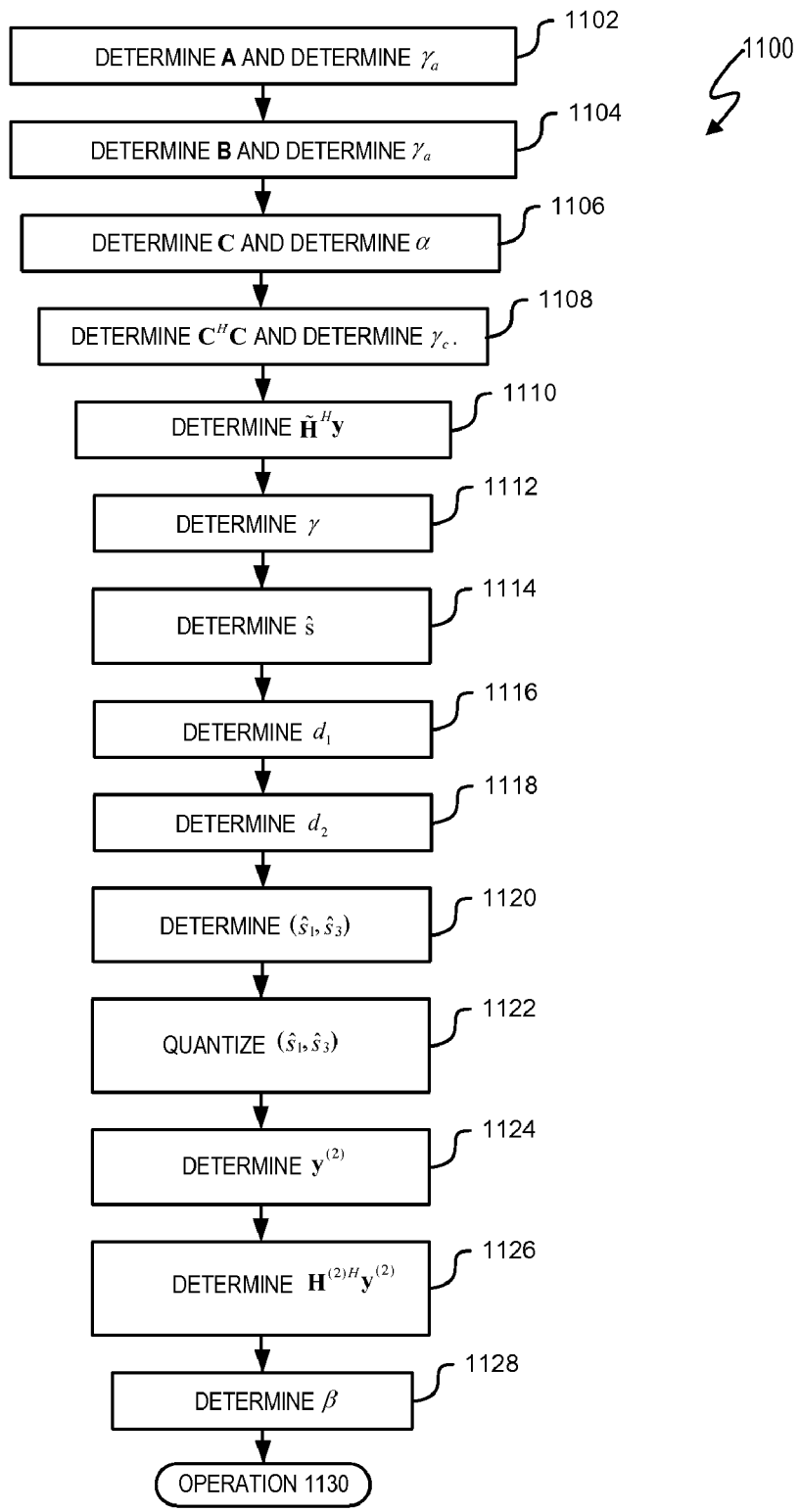
FIG. 11.1

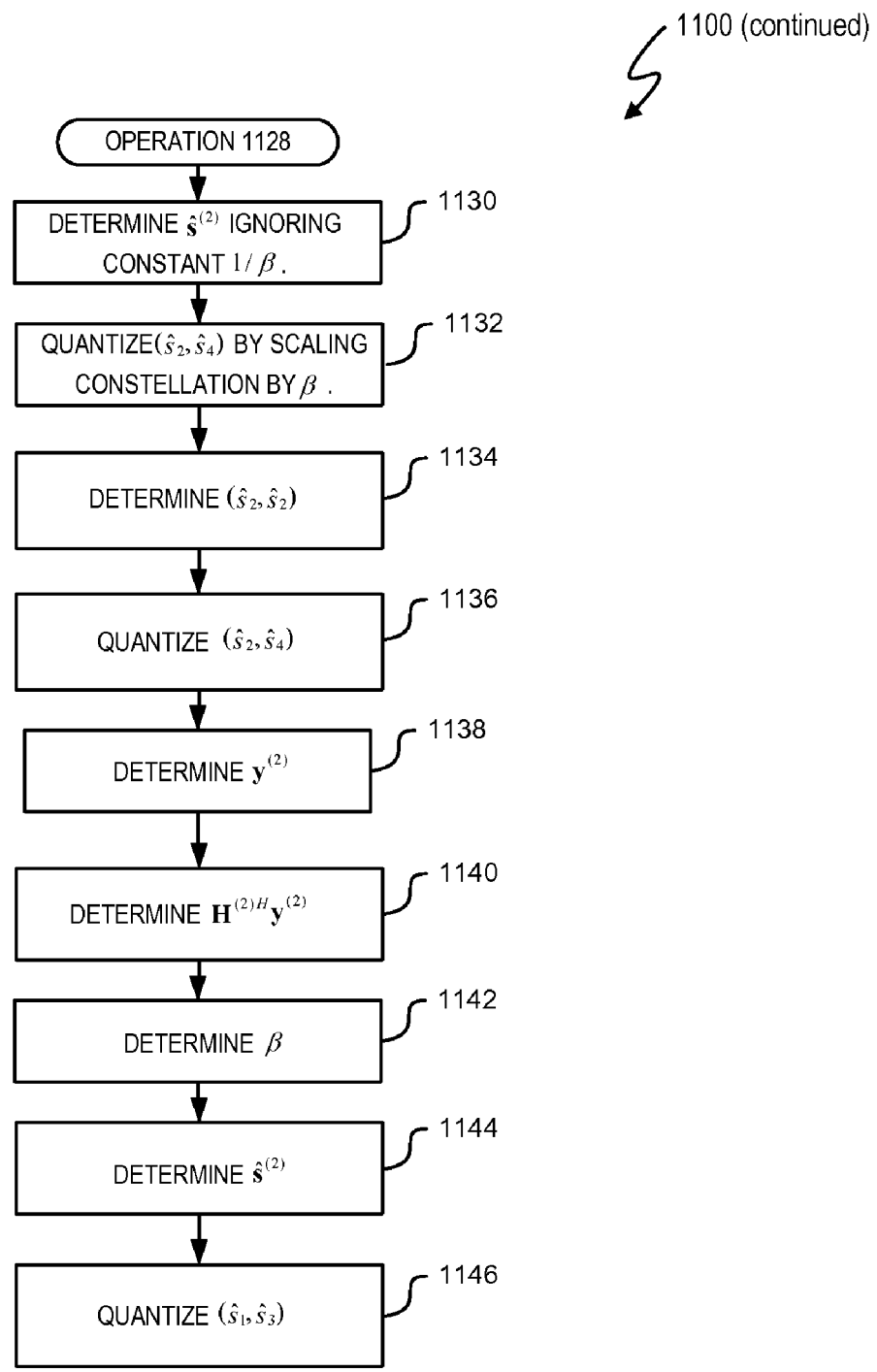
FIG. 11.2

DECODING MIMO SPACE TIME CODE SYMBOL-PAIRS

BACKGROUND OF THE INVENTION

1. Field of the Invention

The present invention relates in general to the field of information processing and in particular relates to a multiple input, multiple output communication system and method for efficient decoding of space time codes using symbol-pair decoding.

2. Description of the Related Art

The demand for wireless communication systems continues to expand. Wireless communication systems transmit and receive signals within a designated electromagnetic frequency spectrum. Wireless communication systems can be virtually any type of wireless one-way or two-way communication device such as cellular telephones, wireless equipped computer systems, and wireless personal digital assistants. The signals communicated between base stations and subscriber stations can include data such as voice, electronic mail, still images, and video.

Various wireless communication technologies employ multiple antennas at the transmitter and receiver of communication devices to improve range and performance of communication systems. Multiple-input multiple-output (MIMO) communication systems employ multiple antennas at both the receiver and transmitter. MIMO systems transmit multiple data streams in parallel thus creating a linear increase in throughput with every pair of receiver/transmitter antennas added to the MIMO system. MIMO systems exploit unique spatial transmission paths between a transmitter and receiver to increase throughput without necessitating an increase in bandwidth or total transmission power.

FIG. 1 depicts an example multiple input, multiple output (MIMO) communication system 100. Generally one communication device is referred to as a base station and one or more other communication devices are referred to as subscriber stations. Additionally, in general, both base stations and subscriber stations include a transmitter and a receiver. Communication system 100 depicts a base station 102 and a single subscriber station 104. The base station 102 is, for example, a cell phone base station, and the subscriber station 104 is, for example, a cellular telephone.

Communication system 100 transmits a signal x and provides at least an intelligible estimate of the signal x to a user. (Note: lower case bold variables indicate vectors and upper case BOLD variables indicate matrices). In at least one embodiment, the signal x is a discrete time signal. The modulator 105 modulates signal x into symbols $x_m$. The particular modulation scheme is a matter of design choice. In one embodiment, modulator 204 performs quadrature amplitude modulation, such as a quadrature phase-shift keying (QPSK). QPSK quantizes each element of signal x to one of four values in a four-value constellation.

Under typical conditions, transmitted data traverses a corrupting transmission environment characterized by scattering, attenuation, reflection, and refraction. The transmitted data is also corrupted by non-idealities n in the receiver, such as thermal noise. Space-time code (STC) encoder 106 employs space-time coding to combine copies of the transmitted symbols s in a way that allows extraction of as much information as possible and to differentiate between transmitted symbols $s=\{s_1, s_2, s_3, \ldots, s_T\}$, where T is a discrete temporal dimension. The STC encoder encodes the symbols s into a linear STC matrix S:

$$S = \begin{pmatrix} s_{11} & s_{12} & \cdots & s_T \\ s_{21} & s_{21} & \cdots & s_{2T} \\ \cdots & \cdots & \cdots & \cdots \\ s_{t1} & s_{t2} & \cdots & s_{tT} \end{pmatrix} \quad (1)$$

The particular space-time code used by the STC encoder 106 is a matter of design choice. Unless otherwise indicated, matrix rows indicate discrete time intervals and matrix columns indicate antenna dimension.

The MIMO modulator/transmitter 108 combines each row of STC matrix S and modulates each combination. In at least one embodiment, modulation is accomplished using orthogonal frequency division multiplexing OFDM modulation. Each row of STC matrix S is then transmitted by modulator/transmitter 108 such that the $i^{th}$ antenna transmits the $i^{th}$ row of STC matrix S.

During transmission between the base station 102 and the subscriber station 104, the transmitted STC matrix S is modified by a channel matrix H. The channel matrix H represents the modification of STC matrix S by the transmission environment. In at least one embodiment, both the base station 102 and subscriber stations 104 know the estimated element values of channel matrix H using, for example, well-known pilot estimation techniques.

A channel matrix $H_{MN}$ can be written generally as an (N×M) matrix where M is the number of transmit antennas and N is the number of receiver antennas. A channel matrix H for a 2×2 MIMO transmitter and receiver system can be represented by a matrix of individual channel coefficients $h_{11}$, $h_{12}$, $h_{21}$, and $h_{22}$ as set forth in Equation (2):

$$H_{22} = \begin{bmatrix} h_{11} & h_{12} \\ h_{21} & h_{22} \end{bmatrix}. \quad (2)$$

$h_{11}$ represents a channel portion from a transmitter antenna 116.1 to a receiver antenna 118.1. $h_{21}$ represents a channel portion from the transmitter antenna 116.1 to a receiver antenna 118.2. $h_{12}$ represents a channel portion from the transmitter antenna 116.2 to the receiver antenna 118.1. $h_{22}$ represents a channel portion from the transmitter antenna 116.2 to the receiver antenna 118.2.

A (3×2) MIMO system has a transmission channel represented by a channel matrix $H_{32}$ set forth in Equation (3):

$$H_{32} = \begin{bmatrix} h_{11} & h_{12} & h_{13} \\ h_{21} & h_{22} & h_{23} \end{bmatrix} \quad (3)$$

A (4×2) MIMO system has a channel represented by a channel matrix $H_{42}$ as set forth in Equation (4):

$$H_{42} = \begin{bmatrix} h_{11} & h_{12} & h_{13} & h_{14} \\ h_{21} & h_{22} & h_{23} & h_{24} \end{bmatrix} \quad (4)$$

and so on.

Space Time Encoding

A MIMO transmitter typically maps a stream of modulated data bits to be sent to a receiver into an appropriate space time code (STC) for transmission. This STC uses the dimensions of space and time to encode the multiple data bits. The use of an array of multiple antennas implements the space dimension, and the time dimension is implemented by having each antenna in the array send a series of transmitted symbols in succession.

In particular, one or more bits from a transmit bit stream are mapped onto a plurality of symbols $s_1$ through $s_T$ chosen from a known constellation of available symbol values. The values of the symbols are used to populate an STC matrix S that represents how the symbols will be sent to the receiver. In particular each symbol will be chosen to represent one or more bits from the bit stream.

The STC matrix S is an (M×K) matrix, where M represents the number of antennas used by the transmitter, and K represents the number of symbols sent by each transmitter for a given set of mapped bits. For example, a MIMO system having a transmitter with four antennas (i.e., M=4), and for which each antenna transmits two symbols for a given set of mapped bits (i.e., K=2), the STC matrix S is a (4×2) matrix is written as:

$$S = S_{42} = \begin{bmatrix} s_1 & s_5 \\ s_2 & s_6 \\ s_3 & s_7 \\ s_4 & s_8 \end{bmatrix} \quad (5)$$

$s_1, s_2, s_3, s_4, s_5, s_6, s_7$, and $s_8$ represent the symbols that the transmitter will be sending to the receiver. It will be understood, however, that this description can apply generally to situations in which M and K have values other than 4 and 2, respectively.

The STC matrix S can actually be considered as a collection of K STC arrays $s_t$ of length M, each representing the transmissions from the M transmit antennas at a given time t. For example, the (4×2) STC matrix $S_{42}$ can be split into a (4×1) array $s_{t1}$ that represents the transmissions of the M transmit antennas at a time $t_1$, and a (4×1) array $s_{t2}$ that represents the transmissions of the M transmit antennas at a time $t_2$, as follows:

$$s_{t1} = \begin{bmatrix} s_1 \\ s_2 \\ s_3 \\ s_4 \end{bmatrix}, \text{ and} \quad (6)$$

$$s_{t2} = \begin{bmatrix} s_5 \\ s_6 \\ s_7 \\ s_8 \end{bmatrix}. \quad (7)$$

In other words, at time $t_1$, the first transmitter antenna will transmit symbol $s_1$, the second transmitter antenna will transmit symbol $s_2$, the third transmitter antenna will transmit symbol $s_3$, and the fourth transmitter antenna will transmit symbol $s_4$. Then at time $t_2$, the first transmitter antenna will transmit symbol $s_5$, the second transmitter antenna will transmit symbol $s_6$, the third transmitter antenna will transmit symbol $s_7$, and the fourth transmitter antenna will transmit symbol $s_8$.

In some embodiments, the symbols $s_1, s_2, s_3, s_4, s_5, s_6, s_7$, and $s_8$ can be separate symbols, each representing one or more bits of data. However, in alternate embodiments one or more of the symbols in the STC matrix S can be a copy of another encoded symbol or derived from another signal and thereby providing duplicate information within the STC matrix S and making the matrix of data more robust.

Thus, in one embodiment, each position in the STC matrix S is provided with its own symbol, and in another embodiment, the same symbol representing the same one or more bits, could be repeated in every location in the STC matrix S. In various other embodiments a number of symbols between one and the total matrix size can be encoded.

For example, one type of STC matrix S used in some embodiments for a (4×L) system (i.e., a 4 transmit antenna system) is described below. An example STC matrix $S_{42}$ is shown for a (4×2) system (i.e., a system with four transmit antennas and two receive antennas). In this example $S_{42}$ is shown as set forth in Equation (8):

$$S_{42} = \begin{bmatrix} s_1 & -s_2^* \\ s_2 & s_1^* \\ s_3 & -s_4^* \\ s_4 & s_3^* \end{bmatrix}, \quad (8)$$

where $s_1^*, s_2^*, s_3^*$, and $s_4^*$ are the conjugates of the symbols $s_1, s_2, s_3$, and $s_4$, respectively.

In other words, to derive the STC matrix $S_{42}$, from the general STC matrix of equation (4), the following equalities are true:

$$s_5 = -s_2^*, \quad (9)$$

$$s_6 = s_1^*, \quad (10)$$

$$s_7 = -s_4^*, \text{ and} \quad (11)$$

$$s_8 = s_3^*. \quad (12)$$

Similarly, for a (3×2) MIMO system, one STC matrix used in one embodiment is denoted as $S_{32}$ is denoted as:

$$S_{32} = \begin{bmatrix} s_1 & -s_2^* \\ s_2 & s_1^* \\ s_3 & -s_4^* \end{bmatrix}, \quad (13)$$

with similar substitutions being made for the elements in a general (3×2) STC matrix $S_{32}$.

In both of these embodiments, a number of data bits are encoded into four separate symbols $s_1, s_2, s_3$, and $s_4$. The B-matrix $S_{42B}$ for a (4×2) MIMO system is populated with the four original symbols, $s_1, s_2, s_3$, and $s_4$, as well as the symbol conjugates $s_1^*$ and $s_3^*$, and the inverse symbol conjugates $-s_2^*$ and $-s_4^*$. Similarly, the B-matrix $S_{32B}$ for a (3×2) MIMO system is populated with the three original symbols, $s_1, s_2$, and $s_3$, as well as the symbol conjugate $s_1^*$, and the inverse symbol conjugates $-s_2^*$ and $-s_4^*$. Thus, for both of these examples, four symbols, each representing one or more bits, are space-time encoded into the STC matrix S.

Each of the N receiver antennas then receives each of the M transmitted signals along a respective signal path for each of the K time intervals. The signals received at the N receiver antennas over the K time intervals can thus be written as an (N×K) receive matrix Y as set forth in Equation ((14):

$$Y = HS + N \quad (14)$$

where H is the (L×M) channel matrix that represents the effect of the transmission channel on a transmitted signal, S is the (M×K) STC array representing the signals transmitted from the M transmitter antennas, and N is an (L×K) noise matrix indicating the noise components received at the L receiver antennas over the K time intervals.

For example, in an embodiment with two receiver antennas (i.e., L=2), and in which each transmitter antenna transmits two symbols for each set of mapped bits (i.e., K=2), Y and N can be represented as follows:

$$Y = \begin{bmatrix} y_1 & y_3 \\ y_2 & y_4 \end{bmatrix}, \text{ and} \quad (15)$$

$$N = \begin{bmatrix} n_1 & n_3 \\ n_2 & n_4 \end{bmatrix}. \quad (16)$$

where $y_1$ and $y_2$ are the signals received at a first and second receiver antennas, respectively, at a first time interval, and $y_3$ and $y_4$ are the signals received at the first and second receiver antennas, respectively, at a second time interval; and where $n_1$ and $n_2$ are noise components received at a first and second receiver antennas, respectively, at a first time interval, and $n_3$ and $n_4$ are noise components received at the first and second receiver antennas, respectively, at a second time interval. The same concepts applied to 4×2 and 3×2 systems be extended to apply to systems in which a larger number of receive antennas are used.

The receive matrix Y is decoded to retrieve the encoded data bits typically with the objective of minimizing the bit error rate (BER), packet error rate (PER), or other some other signal quality measurement.

The STC decoder 112 decodes the received signal matrix Y to extract the transmitted symbols s. In at least one embodiment, the STC decoder 112 decodes received signal matrix Y using minimum mean square estimation with successive interference cancellation (MMSE-SIC).

Referring to FIGS. 1 and 2, the STC decoder 112 decodes the received signal vector y in accordance with the MMSE-SIC decoding process 200. To decode received signal vector y, operation 202 obtains the MMSE least mean square (LMS) estimate of the transmitted symbol $s_i$ with the highest received SNR. Operation 204 quantizes the estimate of the transmitted symbol $\tilde{s}_i$ with the highest received SNR to the nearest value in the symbol constellation, such as a QPSK constellation. Operation 206 subtracts the effect of the quantized symbol $\tilde{s}_i$ from the vector y of received signals and repeats operation 202 until decision operation 208 determines that all symbols in vector s have been decoded. Once all symbols in vector s have been decoded, block 210 indicates that operation 200 resets and repeats for the next vector s.

Following is a more detailed description of MMSE-SIC decoding process 200.

Assume that s and n are zero mean, spatially white vectors and uncorrelated to each other. Then, the linear MMSE estimate of s is given by $$\hat{s} = (\sigma^2 I + \tilde{H}^H \tilde{H})^{-1} \tilde{H}^H y \quad (17)$$

The linear estimator matrix is denoted as $A = (\sigma I + \tilde{H}^H \tilde{H})^{-1} \tilde{H}^H$. The $i^{th}$ throw of A is called the $i^{th}$ MMSE nulling vector. The error covariance matrix is given by $$R = P^{-1} = (\sigma^2 I + \tilde{H}^H \tilde{H})^{-1}. \quad (18)$$

where $P^{-1}$ represents the matrix inverse of the matrix P.

The symbol $\hat{s}_i$ with the highest received SNR in symbol vector s corresponds to the element with the lowest value of error covariance given by $R_{ii}$. "I" represents an identify matrix, and the "H" superscript indicates a Hermitian matrix.

Assuming the number N of symbols in symbol vector s equals 4 and that the highest SNR symbol corresponds to symbol $\hat{s}_4$, MMSE-SIC decoding process 200 determines a fairly accurate estimate of symbol $s_4$ by quantizing symbol $s_4$ and denoting it as an estimated symbol $\hat{s}_4$. Then, assuming that we have correct detection, the effect of symbol $s_4$.

$$y - \tilde{h}_4 \tilde{s}_4 = \tilde{H}^{(3)} s^{(3)} + n \quad (19)$$

where $$\tilde{H}^{(3)} = [\tilde{h}_1 \tilde{h}_2 \tilde{h}_3] s^{(3)} = \begin{pmatrix} s_1 \\ s_2 \\ s_3 \end{pmatrix} \quad (20)$$

and $\tilde{h}_i$ is the $i^{th}$ column of $\tilde{H}$. The solution to equation (19) requires computing the inverse of $P^{(3)} = (\sigma I + \tilde{H}^{(3)H} \tilde{H}^{(3)})$.

Thus, MMSE-SIC decoding process 200 requires computing the inverses of $P^{(i)}$ and performing N−1 recursive procedures for each $s_i$ not having the lowest SNR. Computing the inverses of $P^{(i)}$ and performing N−1 recursive procedures is computationally expensive and may not be practical for real-time signal processing. The computation complexity has been estimated to equal $0.66t^3 + 7r \cdot t^2 + 2r^2 t$.

The channel decoder/demodulator 114 determines an estimate of signal x from the decoded, estimated symbols ŝ. In at least one embodiment, channel decoder/demodulator 114 essentially uses the reverse processes of modulator 105 to determine the estimated signal $\hat{x}$.

Accordingly, there is a need for a more efficient system and process for decoding received signals in a MIMO wireless communication system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 11 depicts a 2×2 STC symbol-pair decoding process.

DETAILED DESCRIPTION

A MIMO wireless communication system and method reduces the number of recursive operations when decoding received data symbols by decoding the data symbols in pairs rather than on a per symbol basis. Decoding in pairs is facilitated by the determination that errors between selected pairs of data symbols are uncorrelated and identically distributed with a determined variance. Additionally, the system and method can order the pairs and provide decoding rules that result in an insignificant loss of performance for a wide range of signal-to-noise ratios (SNRs). Furthermore, the system and method exploit the structure of the error covariance matrix to reduce computational demands.

Figure 1:
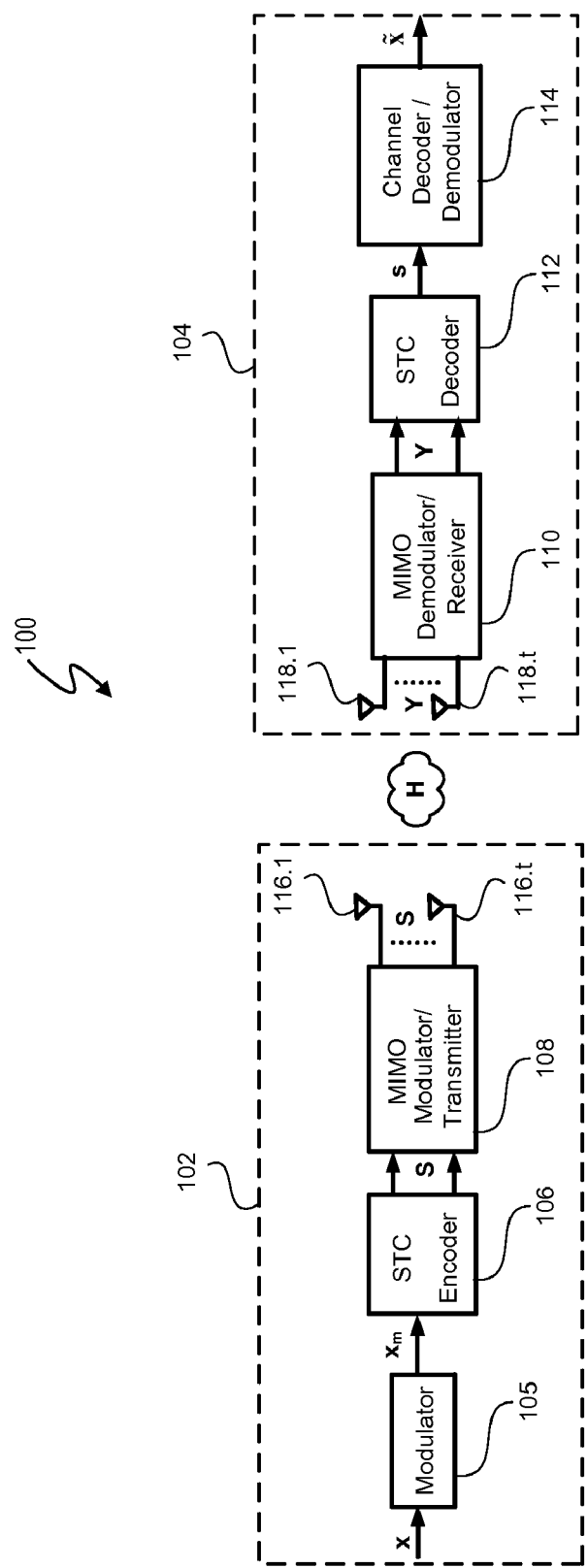
FIG. 1 (labeled prior art) depicts a wireless, multiple input, multiple output (MIMO) communication system.
Figure 2:
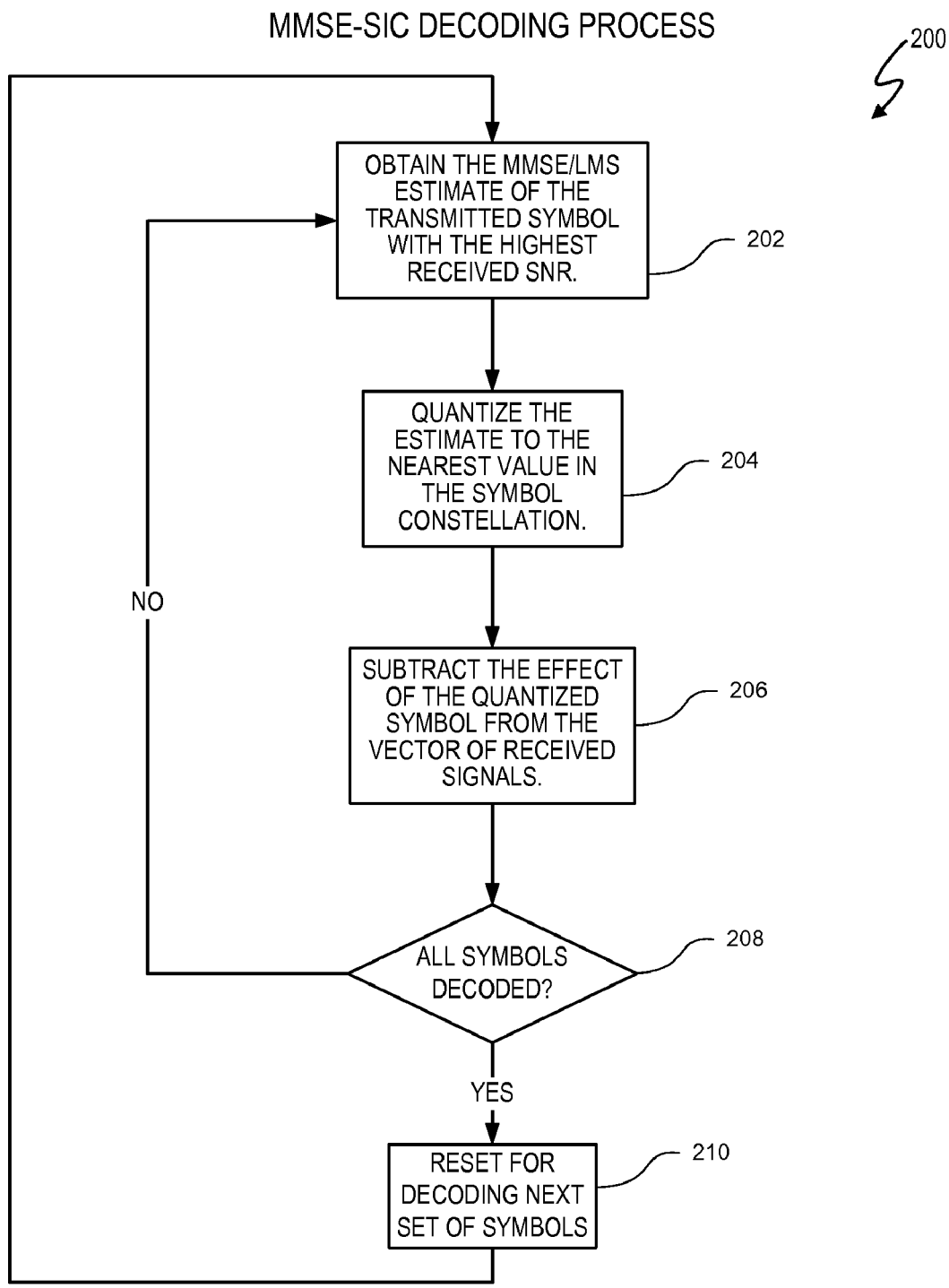
FIG. 2 (labeled prior art) depicts a minimum mean-square-error—successive interference cancellation process.
Figure 3:
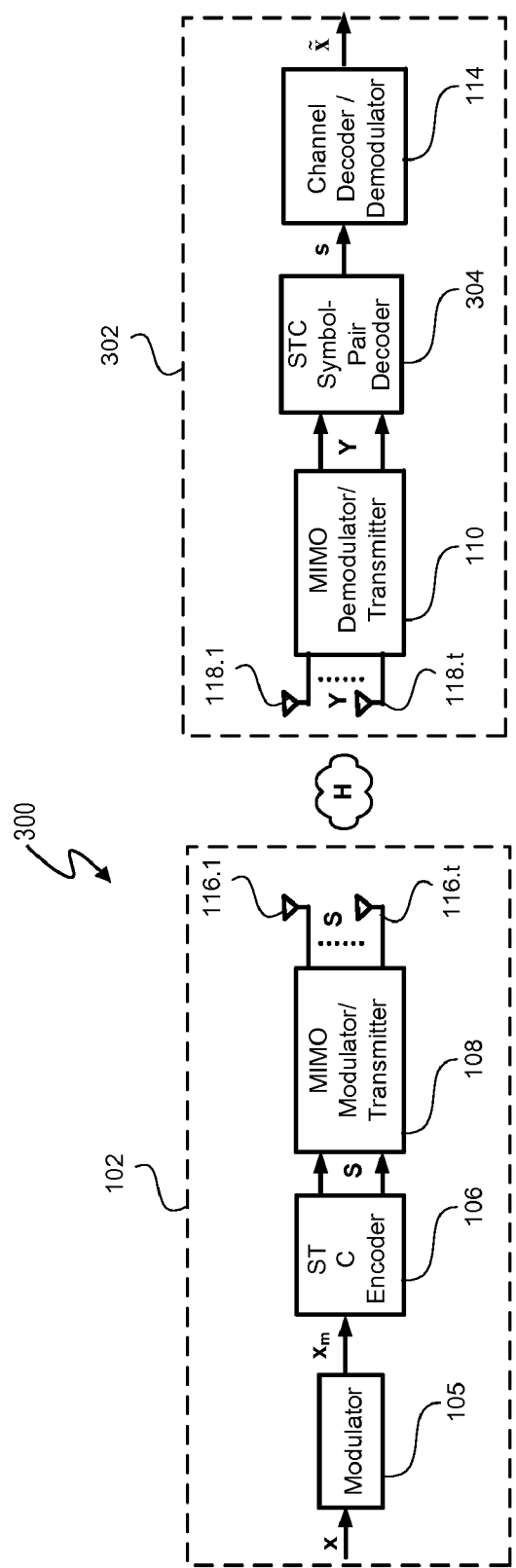
FIG. 3 depicts a MIMO communication system that includes an STC decoder that decodes data symbols in pairs.

FIG. 3 depicts MIMO communication system 300 that includes an STC decoder that decodes data symbols in pairs to reduce recursive operations. In at least one embodiment, the MIMO communication 300 functions identically to the previously described MIMO communication system 100 except for the STC symbol-pair decoder 304. In at least one embodiment, the STC symbol-pair decoder 304 decodes pairs of data symbols in an STC coded matrix S of received data symbols using an MMSE-SIC, symbol pairs decoding process 400 (FIG. 4).

The STC pair decoders for three example MIMO configurations given by 4×2, 3×2 and 2×2 with STCs having a rate of two symbols/period are described herein.

Figure 4:
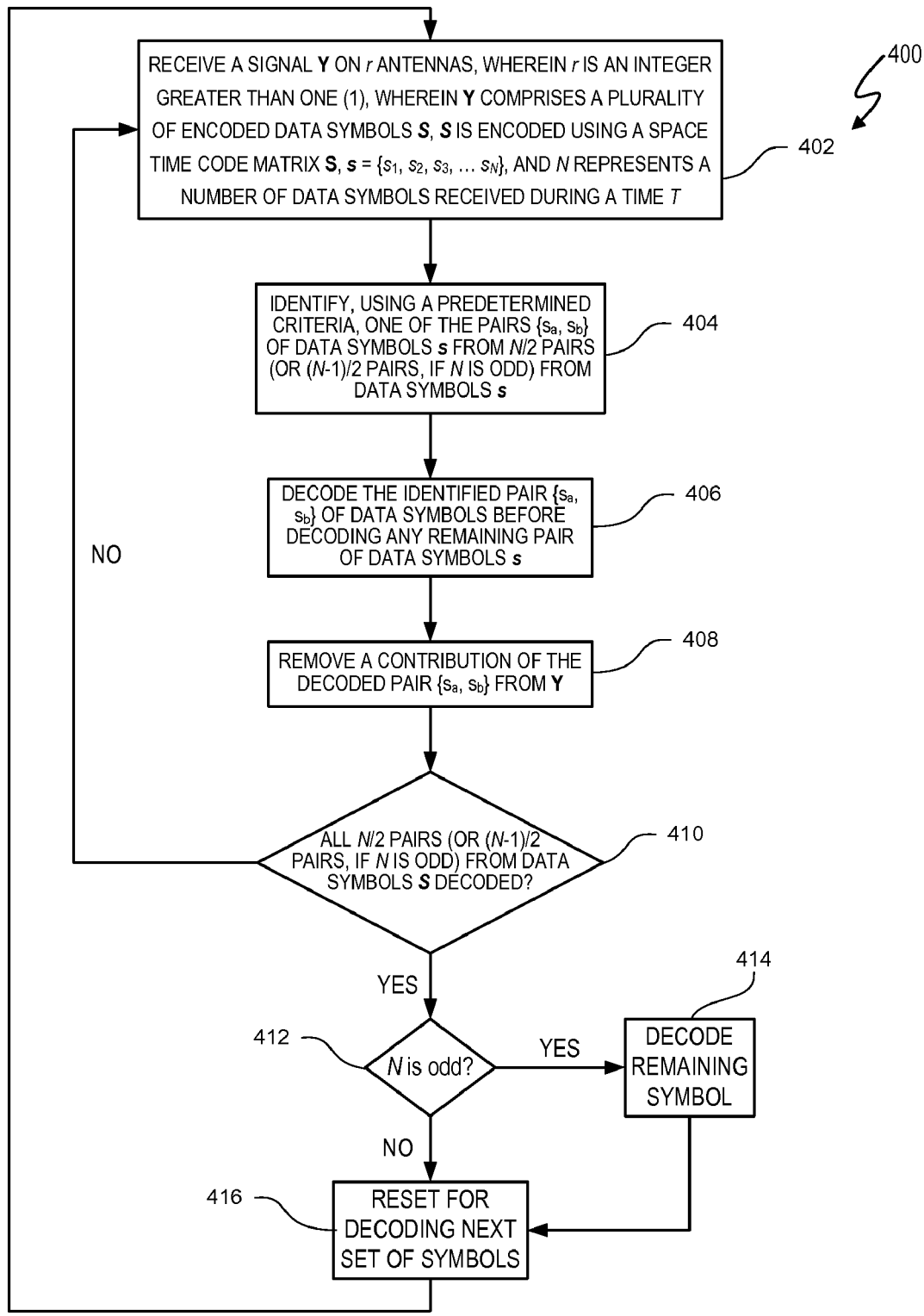
FIG. 4 depicts an MMSE-SIC, symbol pairs decoding process.

FIG. 4 depicts one embodiment of a MMSE-SIC, symbol pairs decoding process 400. Details of each operation are described in more detail following paragraphs. Following is a general overview of the MMSE-SIC, symbol pairs decoding process 400. In operation 402, the MIMO demodulator/receiver 110 receives a signal Y on r antennas, wherein r is an integer greater than one (1), wherein received signal Y represents a plurality of encoded data symbols s, s is encoded using a space time code matrix S, s={$s_1, s_2, s_3, \ldots s_T$}, and T represents a number of data symbols received during a time t. In operation 404, the STC symbol-pair decoder 304 identifies, using a predetermined criteria, one of the pairs {$s_a, s_b$} of data symbols s from T/2*(T−1)/2 pairs if T is odd from data symbols s. In at least one embodiment, the predetermined criteria is used to select the pair {$s_a, s_b$} of data symbols that maximizes the SNR of the decoded data symbols s. In operation 406, the STC decoder 304 decodes the identified pair {$s_a, s_b$} of data symbols before decoding any remaining pair of data symbols s. In operation 408, STC decoder 304 removes a contribution from the decoded pair {$s_a, s_b$} from received signal Y. In at least one embodiment, the contributions of each symbol $s_a$ and $s_b$ are the values of symbol $s_a$ and $s_b$. In at least one embodiment, the contributions of each symbol $s_a$ and $s_b$ are $\hat{s}_3$ and $\hat{s}_4$, where $\hat{s}_3$ and $\hat{s}_4$ represent the respective quantized values of the symbols $s_a$ and $s_b$. In operation 410, if any pairs of data symbols have not been decoded from the T/2 pairs (T−1)/2 pairs if T is odd), MMSE-SIC, symbol pairs decoding process 400 returns to operation 402 to decode a next pair of data symbols. Otherwise, if T is odd, a single symbol remains to be decoded. Thus, if T is odd in operation 412, operation 414 decodes the remaining symbol. If T is even or after completing operation 414 if T is odd, in operation 416, MMSE-SIC, symbol pairs decoding process 400 resets to decode a next set of symbols s. In another embodiment, if T is odd, the symbol not paired with another symbol can be decoded before or after any symbol pair decoding.

The MIMO communication system 300 and MMSE-SIC, symbol pairs decoding process 400 reduces the complexity of decoding symbol pairs by efficiently computing the inverse of the matrix $P^{(i)}$ and reducing recursion operations in successive interference cancellation.

The matrix $P^{(i)}$ has the following structure (since the matrix is Hermitian):

$$P = \begin{pmatrix} A & C \\ C^H & B \end{pmatrix}. \quad (21)$$

By defining:

$$D = B - C^H A^{-1} C, \quad (22)$$

if matrices A and D are non-singular, then the inverse of matrix P has the following closed form:

$$R = P^{-1} = \begin{pmatrix} A^{-1} + A^{-1}CD^{-1}C^H A^{-1} & -A^{-1}CD^{-1} \\ -D^{-1}C^H A^{-1} & D^{-1} \end{pmatrix}. \quad (23)$$

Note that the error covariance matrix $P^{-1}$ has a structure similar to P in (18). At least one embodiment of the MIMO communication system 300 efficiently implements error covariance matrix $P^{-1}$ by exploiting the structure of the equivalent channel matrix $\tilde{H}$.

The MIMO communication system 300 supports various STC matrix S dimensions. In 4×2 and 3×2 STC decoder 304 embodiments, the MIMO communication system 300 exploits the biorthogonality of estimated channel matrix $\tilde{H}$. For the 2×2 case, equivalent channel matrix $\tilde{H}$ does not initially indicate biorthogonality. For the 2×2 case, in at least one embodiment, the 2×2 STC decoder 304 performs a linear mapping of symbol vector s to develop a structure in the resulting equivalent channel matrix $\tilde{H}$, which is exploited to obtain an efficient symbol-pair decoding process.

In the STC illustrative decoding problems described herein, inversions of 4×2, 3×2, and 2×2 symbol matrices S are used by the MMSE-SIC symbol pairs decoding process 400. Reduction in order of recursion is obtained by decoding symbols in pairs instead of one symbol $\hat{s}_i$ per recursion operation. Performing MMSE-SIC, symbol pairs decoding process 400 in pairs can result in a loss of quality. At least one embodiment of the MMSE-SIC, symbol pairs decoding process 400 orders symbol pairs and includes rules for decoding order that result in improved SNR relative to unordered symbol pair decoding.

STC Symbol-Pair Decoder 304 for a 4×2 MIMO Matrix

Figure 5:
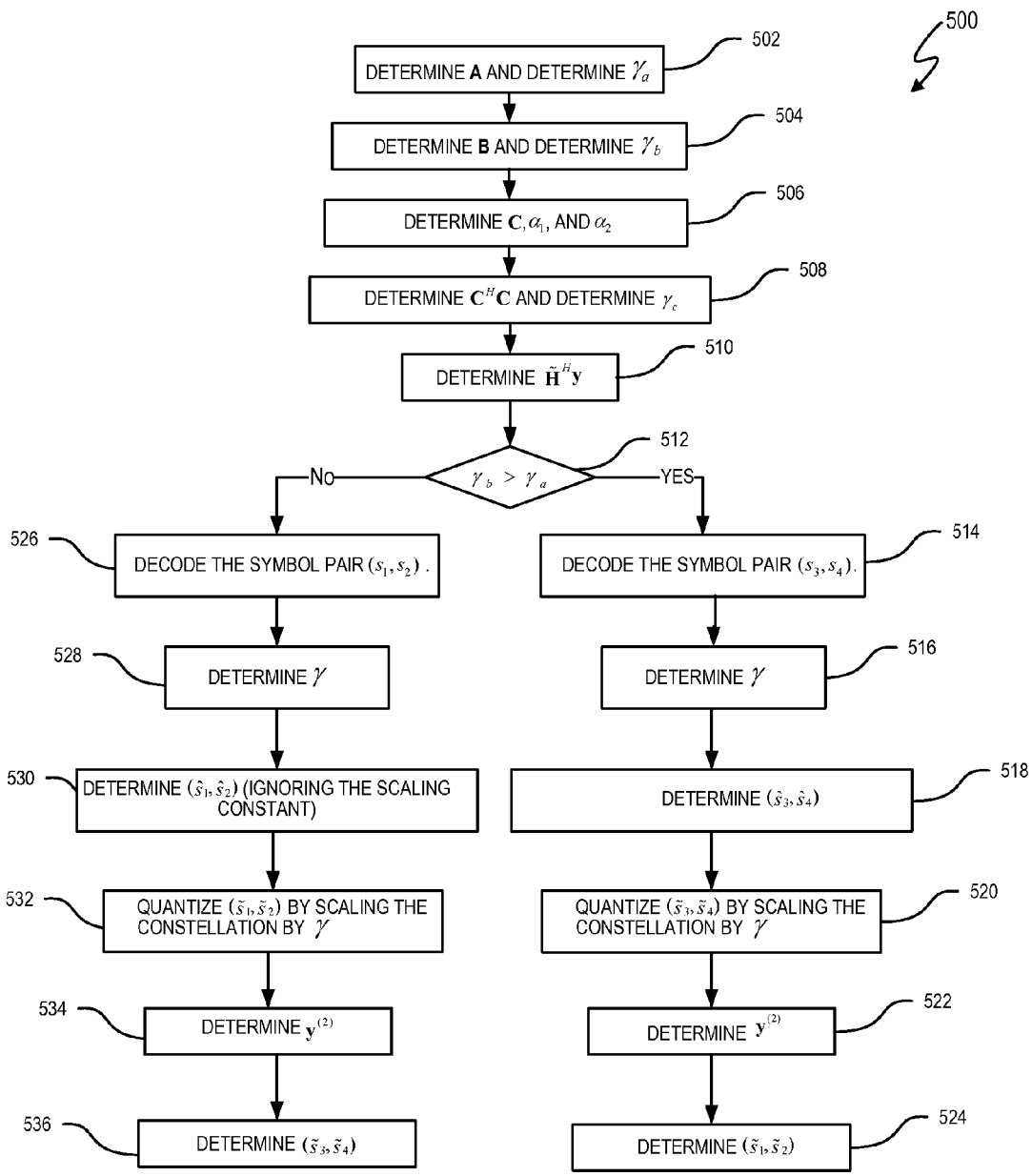
FIG. 5 depicts a 4×2 STC symbol-pair decoding process.

The STC symbol-pair decoder 304 can be configured to decode a variety of k×m dimensional signals Y. FIG. 5 depicts a 4×2 STC symbol-pair decoding process 500.

Referring to FIGS. 3 and 5, the signal Y received by subscriber station 104 is represented by:

$$Y = HS + N \quad (24)$$

where $$Y = \begin{pmatrix} y_1 & y_2 & y_3 & y_4 \\ y_5 & y_6 & y_7 & y_8 \end{pmatrix},$$

$$H = \begin{pmatrix} h_1 & h_2 & h_3 & h_4 \\ h_5 & h_6 & h_7 & h_8 \end{pmatrix},$$

$$S = \begin{pmatrix} s_1 & -s_2^* & s_5 & -s_6^* \\ s_2 & s_1^* & s_6 & s_5^* \\ s_3 & -s_4^* & s_7 & -s_8^* \\ s_4 & s_3^* & s_8 & s_7^* \end{pmatrix} \quad (25)$$

The asterisk "*" indicates a complex conjugate. The STC matrix S is defined as the STC "matrix B" coding scheme in the Institute of Electrical and Electronic Engineers (IEEE) 802.16e specification. STC symbol-pair decoder 304 can be modified to accommodate other STC coding schemes. STC symbol-pair decoder 304 can decode in blocks of two time periods i.e. $s_1, s_2, s_3, s_4$ are present only in the first two time periods (columns 1 and 2) and similarly $s_5, s_6, s_7, s_8$ are present only in the last two time periods (columns 3 and 4). For each of the two time periods, STC matrix S code can be separated in two parts of two symbols each. The particular STC matrix for the 4×2, 3×2, 2×2, and all other systems is a matter of design choice. For example, equivalent STC matrices can be used.

The received symbols in the first two periods can be written in vector form as:

$$y = \tilde{H}s + n \quad (26)$$

where:

$$y = \begin{pmatrix} y_1 \\ y_2^* \\ y_5 \\ y_6^* \end{pmatrix}; \tilde{H} = \begin{pmatrix} h_1 & h_2 & h_3 & h_4 \\ h_2^* & -h_1^* & h_4^* & -h_3^* \\ h_5 & h_6 & h_7 & h_8 \\ h_6^* & -h_5^* & h_8^* & -h_7^* \end{pmatrix}; s = \begin{pmatrix} s_1 \\ s_2 \\ s_3 \\ s_4 \end{pmatrix}. \quad (27)$$

The matrix P has the structure (21) where:

$$A = \gamma_a I_2; \gamma_a = |h_1|^2 + |h_2|^2 + |h_5|^2 + |h_6|^2 + \sigma^2, \quad (28)$$

$$B = \gamma_b I_2; \gamma_b = |h_3|^2 + |h_4|^2 + |h_7|^2 + |h_8|^2 + \sigma^2, \quad (29)$$

$$C = \begin{pmatrix} \alpha_1 & \alpha_2 \\ -\alpha_2^* & \alpha_1^* \end{pmatrix}, \quad (30)$$

$$\alpha_1 = h_1^* h_3 + h_2 h_4^* + h_5^* h_7 + h_6 h_8^*, \text{ and} \quad (31)$$

$$\alpha_2 = h_1^* h_4 - h_2 h_3^* + h_5^* h_8 - h_6 h_7^*. \quad (32)$$

Note that C is a unitary matrix, i.e.

$$C^H C = \gamma_c I_2; \gamma_c = |\alpha_1|^2 + |\alpha_2|^2. \quad (33)$$

From Equations (28), (29) and (33), matrix D is diagonal i.e.:

$$D = \left(\frac{\gamma}{\gamma_a}\right) I_2; \quad \gamma = \gamma_a \gamma_b - \gamma_c. \quad (34)$$

The matrices $A^{-1} + A^{-1}CD^{-1}C^H A^{-1}$ and $D^{-1}$ are both diagonal where:

$$A^{-1} + A^{-1}CD^{-1}C^H A^{-1} = \left(\frac{1}{\gamma_a} + \frac{\gamma_c}{\gamma_a \gamma}\right) I_2 = \frac{\gamma_b}{\gamma} I. \quad (35)$$

The diagonal property of matrix D reflects the biorthogonal structure of equivalent channel matrix $\tilde{H}$ and implies that errors $s_1 - \hat{s}_1$ and $s_2 - \hat{s}_2$ are uncorrelated and identically distributed with variance $$E(|s_1 - \hat{s}_1|^2) = E(|s_2 - \hat{s}_2|^2) = \frac{\gamma_b}{\gamma}. \quad (36)$$

Similarly, the errors $s_3 - \hat{s}_3$ and $s_4 - \hat{s}_4$ are also uncorrelated and identically distributed with variance:

$$E(|s_3 - \hat{s}_3|^2) = E(|s_4 - \hat{s}_4|^2) = \frac{\gamma_a}{\gamma}. \quad (37)$$

Because the errors are uncorrelated, STC symbol-pair decoder 304 can decode the symbol data in pairs using MMSE decoding. To reduce SNR quality losses, in at least one embodiment, STC symbol-pair decoder 304 decodes the symbol pairs in a particular order in accordance with one or more metrics. The particular metric or metrics are a matter of design choice. In at least one embodiment, STC symbol-pair decoder 304 decodes the symbol pair first that corresponds to the highest received SNR, the lowest error covariance, the highest SNR plus interference ratio, or some other performance measure as determined by design choice. From Equations (36) and (37), the decoding order is determined by: if $\gamma_a > \gamma_b$, first decode the pair $(s_1, s_2)$, else decode the pair $(s_3, s_4)$. Equation (17) can be used to decode the symbol $s_i$.

Assuming $\gamma_a > \gamma_b$, symbols $(s_3, s_4)$ are determined as follows: (from row 2, column 1 and row 2, column 2 of $P^{-1}$ equation (23)):

$$\begin{pmatrix} \hat{s}_3 \\ \hat{s}_4 \end{pmatrix} = (-D^{-1}C^H A^{-1} D^{-1}) \tilde{H}^H y \quad (38)$$

$$= \frac{1}{\gamma} \begin{pmatrix} -\alpha_1^* & \alpha_2 & \gamma_a & 0 \\ -\alpha_2^* & -\alpha_1 & 0 & \gamma_a \end{pmatrix} \tilde{H}^H y.$$

The estimated symbols are then quantized to obtain $(\hat{s}_3, \hat{s}_4)$. The particular quantization process is a matter of design choice. In at least one embodiment, STC symbol-pair decoder 304 maps estimated symbols $\hat{s}_3$ and $\hat{s}_4$ to a QPSK constellation. The contribution of the decoded symbol pairs are removed from the equivalent received signal vector y to obtain the reduced order problem:

$$y^{(2)} = y - \tilde{h}_3 \hat{s}_3 - \tilde{h}_4 \hat{s}_4 \quad (39)$$

$$= \tilde{H}^{(2)} s^{(2)} + n$$

$$= [\tilde{h}_1 \tilde{h}_2] s^{(2)} + n$$

$$= \begin{pmatrix} h_1 & h_2 \\ h_2^* & -h_1^* \\ h_5 & h_6 \\ h_6^* & -h_5^* \end{pmatrix} \begin{pmatrix} s_1 \\ s_2 \end{pmatrix} + n.$$

Since $\tilde{H}^{(2)}$ is an orthogonal STC matrix, decoding of the remaining estimated signal pairs $(\hat{s}_1, \hat{s}_2)$ is from:

$$\begin{pmatrix} \tilde{s}_1 \\ \tilde{s}_2 \end{pmatrix} = \tilde{H}^{(2)H} \tilde{y}^{(2)} = \tilde{H}^{(2)H} \tilde{H}^{(2)} s^{(2)} + \tilde{H}^{(2)H} n = \gamma_a \begin{pmatrix} s_1 \\ s_2 \end{pmatrix} + \tilde{H}^{(2)H} n. \quad (40)$$

If $\gamma_a > \gamma_b$, then the symbol pair $(s_1, s_2)$ is decoded first using (4). Rows 1 and 2 of error covariance matrix $P^{-1}$ are used to obtain $(\hat{s}_1, \hat{s}_2)$ $$\begin{pmatrix} \hat{s}_1 \\ \hat{s}_2 \end{pmatrix} = (A^{-1} + A^{-1}CD^{-1}C^H A^{-1} - A^{-1}CD^{-1})\tilde{H}^H y \qquad (41)$$

$$= \frac{1}{\gamma}\begin{pmatrix} \gamma_b & 0 & -\alpha_1 & \alpha_2^* \\ 0 & \gamma_a & -\alpha_2 & -\alpha_1^* \end{pmatrix}\tilde{H}^H y \qquad (42)$$

The estimated symbols are then quantized to obtain $(\tilde{s}_1, \tilde{s}_2)$. Again, the particular quantization process is a matter of design choice and, in at least one embodiment, STC symbol-pair decoder 304 maps estimated symbols $\hat{s}_1$ and $\hat{s}_2$ to a QPSK constellation. The contribution of the decoded symbol pairs are removed from the equivalent received signal vector $\tilde{y}$ to obtain the reduced order problem:

$$\begin{aligned} y^{(2)} &= y - \tilde{h}_1 \tilde{s}_1 - \tilde{h}_2 \tilde{s}_2 \qquad (43) \\ &= \tilde{H}^{(2)} s^{(2)} + n \\ &= [\tilde{h}_3 \tilde{h}_4] s^{(2)} + n \\ &= \begin{pmatrix} h_3 & h_4 \\ h_4^* & -h_3^* \\ h_7 & h_8 \\ h_8^* & -h_7^* \end{pmatrix} \begin{pmatrix} s_3 \\ s_4 \end{pmatrix} + n. \end{aligned}$$

Since $\tilde{H}^{(2)}$ is an orthogonal STC matrix, decoding of the remaining estimated signal pairs $(\tilde{s}_3, \tilde{s}_4)$ is from:

$$\begin{pmatrix} \hat{s}_3 \\ \hat{s}_4 \end{pmatrix} = \tilde{H}^{(2)H} y^{(2)} = \tilde{H}^{(2)H}\tilde{H}^{(2)}s^{(2)} + \tilde{H}^{(2)H}n = \gamma_b\begin{pmatrix} s_3 \\ s_4 \end{pmatrix} + \tilde{H}^{(2)H}n. \qquad (44)$$

Thus, the recursion is reduced from order 4 to order 2, which significantly reduces computational requirements. Additionally, the structure of error covariance matrix $P^{-1}$ allows process 500 to symbol-pair decode symbols in STC matrix S by computing the elements of error covariance matrix $P^{-1}$ in an efficient manner as described above. In comparison, conventional decoding processes use singular value decomposition or a square root method which have significantly higher complexity.

FIG. 5 depicts an embodiment of a 4×2 STC symbol-pair decoding process 500. Process 500 also depicts the simulated multiply and accumulate operations for each operation. Operation 502 determines A and determines $\gamma_a$ from (15) [4 multiply-accumulate operations ("macs")]. Operation 504 determines B and determines $\gamma_b$ from (16) [4 macs]. Operation 506 determines C, $\alpha_1$, and $\alpha_2$ from (18) and (19) [8 macs]. Operation 508 determines $C^H C$ and determines $\gamma_c$ [2 macs]. Operation 510 determines $\tilde{H}^H \tilde{y}$ [16 macs]. Operation 512 determines if $\gamma_b > \gamma_a$. If "yes" in operation 512, operation 514 decodes the symbol pair $(s_3, s_4)$.

If $\gamma_b > \gamma_a$; operation 516 determines $\gamma_b$ from (29) [1 mac]. Operation 518 determines $(\hat{s}_3, \hat{s}_4)$ from (38) (ignoring the scaling constant) [6 macs]. Operation 520 quantizes $(\tilde{s}_3, \tilde{s}_4)$ by scaling the constellation by $\gamma$ [3×2=6 macs (at most for 64 quadrature amplitude modulation]. Operation 522 determines $y^{(2)}$ from (39) [8 macs]. Operation 524 determines $(\tilde{s}_1, \tilde{s}_2)$ from (40) [8 macs]. The total macs for 4×2 STC symbol-pair decoding process 500 is 63 macs. If $\gamma_b < \gamma_a$, in operation 512, operation 526 decodes the symbol pair $(s_1, s_2)$. Operation 528 determines $\gamma$ from (28) [1 mac]. Operation 530 determines $(\tilde{s}_1, \tilde{s}_2)$ from (41) (ignoring the scaling constant) [6 macs]. Operation 532 quantizes $(\tilde{s}_1, \tilde{s}_2)$ by scaling the constellation by $\gamma$ [3×2=6 macs (at most for 64 quadrature amplitude modulation]. Operation 534 determines $\tilde{y}^{(2)}$ from (43) [8 macs]. Operation 536 determines $(\tilde{s}_3, \tilde{s}_4)$ from (44) [8 macs].

If only MMSE is used without successive interference cancellation, then operations 522 and 524 are not performed. Estimating $(\tilde{s}_1, \tilde{s}_2)$ adds complexity since columns 1 and 2 of $P^{-1}$ and estimation are used which is about 1+6=7 macs. So, total complexity for only MMSE decoding is 60−16+7=51 macs.

Figure 6:
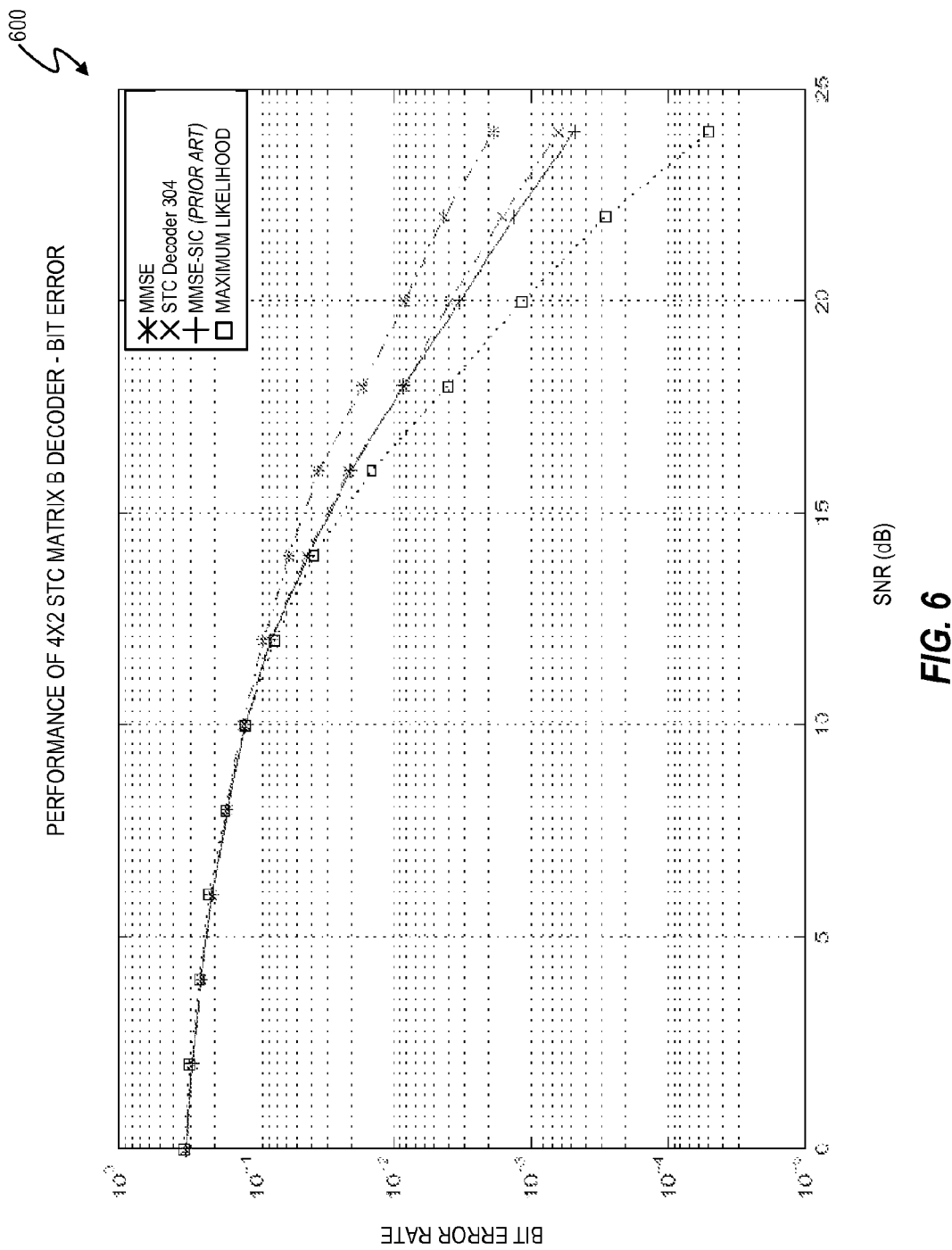
FIG. 6 depicts a 4×2 MIMO matrix B—Bit-error-rate comparison of MMSE, MMSE-SIC and maximum likelihood (ML) decoders with an STC symbol-pair decoder
Figure 7:
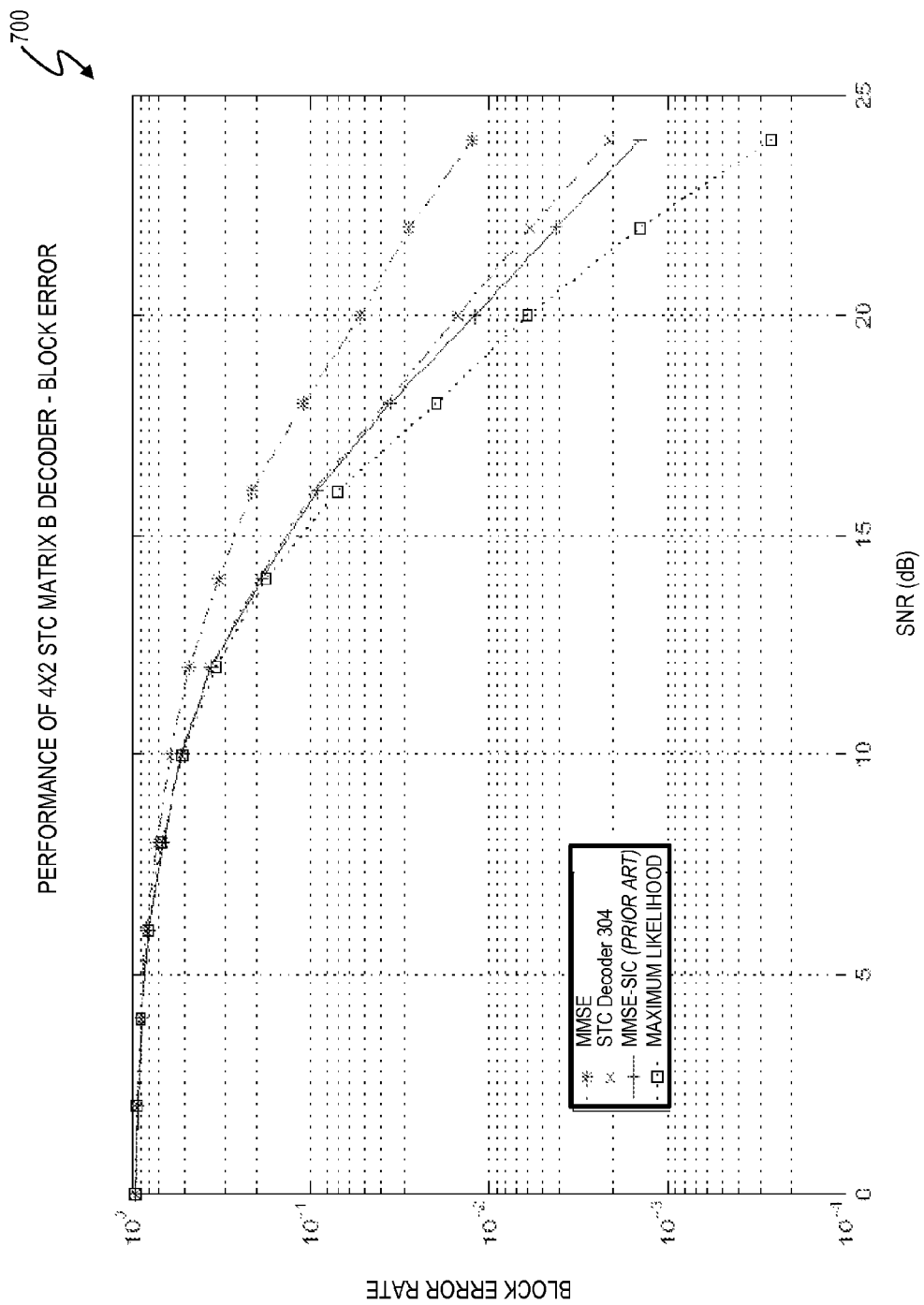
FIG. 7 depicts a 4×2 MIMO matrix B—Block-error-rate comparison of conventional MMSE, MMSE-SIC and ML decoders with an STC symbol-pair decoder.

Comparison simulations are depicted in FIGS. 6 and 7 for a narrowband MIMO channel with zero temporal correlation and spatially independent, identically distributed links for uncoded data symbols from a QPSK constellation. It is assumed that the channel matrix H is perfectly known at the receiver. FIG. 6 depicts the comparison of STC symbol-pair decoder 304 (also referred to as the MMSE-SIC-2 decoder) to the MMSE, MMSE-SIC, and ML detectors. The STC symbol-pair decoder 304 demonstrates negligible loss compared to the MMSE-SIC decoder even though the symbols are decoded and canceled in pairs instead of symbol by symbol decoding and cancellation as in the conventional MMSE-SIC decoding process. Thus, STC symbol-pair decoder 304 provides a considerable complexity advantage for a negligible performance loss at $10^{-2}$ BER and 0.5 dB at $10^{-3}$ BER. Comparing the STC symbol-pair decoder 304 using MMSE-SIC versus MMSE only, the advantage of using successive interference cancellation is clear—the gain is about 1.75 dB at $10^{-2}$ BER and 3 dB at $10^{-3}$ BER. In addition, the MMSE-SIC and MMSE-SIC-2 detectors have a 1 dB loss compared to the (optimal) ML detector at $10^{-2}$ BER and 2.5 dB at $10^{-3}$ BER.

FIG. 7 depicts a comparison/performance chart 700 for a 4×2 MIMO matrix B—Block-error-rate comparison of conventional MMSE, MMSE-SIC and ML decoders with STC symbol-pair decoder 304 for the space-time code block error rate with similar observations as described in association with FIG. 6.

Assuming an operating point of $10^{-2}$, the MMSE-SIC STC symbol-pair decoder 304 using successive interference cancellation is within 1 dB of the optimal detector.

STC Symbol-Pair Decoder For 3×2 MIMO STC Matrix B

Figure 8:
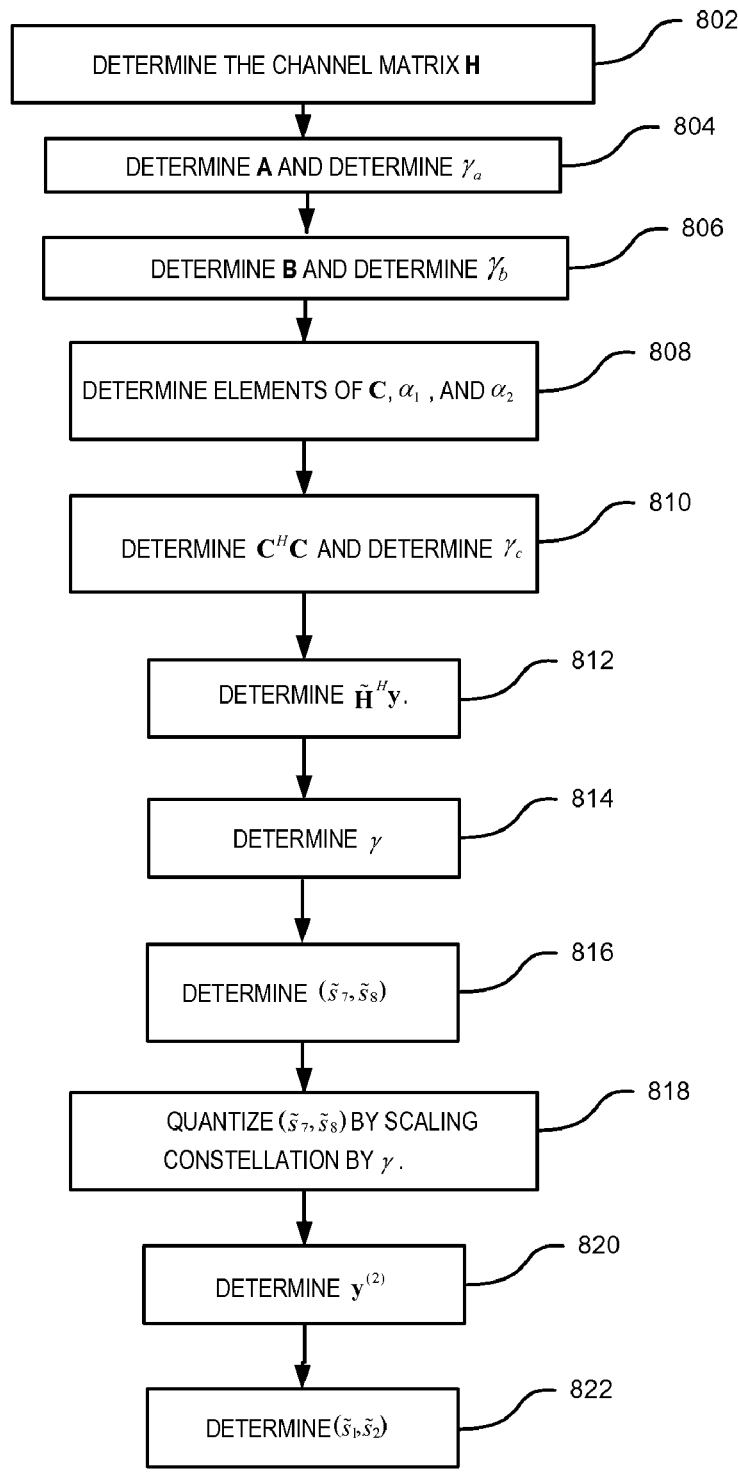
FIG. 8 depicts a 3×2 STC symbol-pair decoding process.

Referring to FIGS. 3 and 8, STC pair decoder 304 can also be configured to decode a 3×2 MIMO STC matrix S. For a 3×2 MIMO STC matrix S, the signal Y received by subscriber station 302 is represented by:

$$Y = HS + N \qquad (45)$$

where:

$$Y = \begin{pmatrix} y_1 & y_2 & y_3 & y_4 \\ y_5 & y_6 & y_7 & y_8 \end{pmatrix}, \qquad (46)$$

$$H = \begin{pmatrix} h_1 & h_2 & h_3 \\ h_5 & h_6 & h_7 \end{pmatrix}, \qquad (47)$$

$$S = \begin{pmatrix} \sqrt{\frac{3}{4}} & 0 & 0 \\ 0 & \sqrt{\frac{3}{4}} & 0 \\ 0 & 0 & \sqrt{\frac{3}{2}} \end{pmatrix} \begin{pmatrix} \tilde{s}_1 & -\tilde{s}_2^* & \tilde{s}_5 & -\tilde{s}_6^* \\ \tilde{s}_2 & \tilde{s}_1^* & \tilde{s}_6 & \tilde{s}_5^* \\ \tilde{s}_7 & -\tilde{s}_8^* & \tilde{s}_3 & -\tilde{s}_4^* \end{pmatrix}. \qquad (48)$$

In Equation (32) the following notation is used:

$$\tilde{s}_1 = s_{1I} + js_{3Q};\ \tilde{s}_2 = s_{2I} + js_{4Q};\ \tilde{s}_3 = s_{3I} + js_{1Q};\ \tilde{s}_4 = s_{4I} + js_{2Q}; \qquad (49)$$

$$\tilde{s}_5 = s_{5I} + js_{7Q};\ \tilde{s}_6 = s_{6I} + js_{8Q};\ \tilde{s}_7 = s_{7I} + js_{5Q};\ \tilde{s}_8 = s_{8I} + js_{6Q}; \qquad (50)$$

where $s_i=s_{iI}+js_{iQ}$ and the subscripts "I" and "Q" refer to the real and imaginary parts, respectively, of the complex value $s_i$.

Decoding of $s_i$ can be equivalently accomplished by decoding $\tilde{s}_i$. Similar to the 4×2 case, decoding proceeds by noting that the STC code of Equation (48) can be separated into two parts of two symbols each, i.e. $\tilde{s}_1, \tilde{s}_2, \tilde{s}_7, \tilde{s}_8$ are present only in the first two time periods and similarly $\tilde{s}_3, \tilde{s}_4, \tilde{s}_5, \tilde{s}_6$ are present only in the last two time periods. Thus, STC symbol-pair decoder 304 can decode in blocks of two time periods. However, unlike the 4×2 case, in at least one embodiment, all of the $\tilde{s}_i$, i=1, . . . , 8, are decoded to obtain all symbols $s_i$, i=1, . . . , 8.

Re-writing the received signal Y by absorbing the diagonal matrix of the STC code in Equation (48) into the channel matrix H gives:

$$Y = HS + N \quad (51)$$

where $$H = \begin{pmatrix} h_1 & h_2 & h_3 \\ h_5 & h_6 & h_7 \end{pmatrix}, S = \begin{pmatrix} \tilde{s}_1 & -\tilde{s}_2^* & \tilde{s}_5 & -\tilde{s}_6^* \\ \tilde{s}_2 & \tilde{s}_1^* & \tilde{s}_6 & \tilde{s}_5^* \\ \tilde{s}_7 & -\tilde{s}_8^* & \tilde{s}_3 & -\tilde{s}_4^* \end{pmatrix} \quad (52)$$

$$h_1 = \sqrt{\frac{3}{4}} h_1; h_2 = \sqrt{\frac{3}{4}} h_2; h_3 = \sqrt{\frac{3}{2}} h_3; \quad (53)$$

$$h_5 = \sqrt{\frac{3}{4}} h_5; h_6 = \sqrt{\frac{3}{4}} h_6; h_7 = \sqrt{\frac{3}{2}} h_7$$

The received symbols in the first two periods can be written in vector form as $$y = \tilde{H}\tilde{s} + n \quad (54)$$

where:

$$y = \begin{pmatrix} y_1 \\ y_2^* \\ y_5 \\ y_6^* \end{pmatrix}; \tilde{H} = \begin{pmatrix} h_1 & h_2 & h_3 & 0 \\ h_2^* & -h_1^* & 0 & -h_3^* \\ h_5 & h_6 & h_7 & 0 \\ h_6^* & -h_5^* & 0 & -h_7^* \end{pmatrix}; \tilde{s} = \begin{pmatrix} \tilde{s}_1 \\ \tilde{s}_2 \\ \tilde{s}_7 \\ \tilde{s}_8 \end{pmatrix}. \quad (55)$$

Comparing (27) and (55), the 3×2 symbol-pair decoding process 800 (FIG. 8) is similar to the previously described 4×2 decoding process where $h_4=h_8=0$ and the other $h_i$'s are scaled as in (53). Accordingly, for the 3×2 STC matrix S:

$$A = \gamma_a I_2; \gamma_a = |h_1|^2 + |h_2|^2 + |h_5|^2 + |h_6|^2 + \sigma^2, \quad (56)$$

$$B = \gamma_b I_2; \gamma_b = |h_3|^2 + |h_7|^2 + \sigma^2, \quad (57)$$

$$C = \begin{pmatrix} \alpha_1 & \alpha_2 \\ -\alpha_2^* & \alpha_1^* \end{pmatrix}, \quad (58)$$

$$\alpha_1 = h_1^* h_3 + h_5^* h_7, \text{ and} \quad (59)$$

$$\alpha_2 = -h_2 h_3^* - h_6 h_7^* \quad (60)$$

Otherwise, the 3×2 symbol-pair decoding process 800 is identical to the previously described 4×2 decoding process. Thus, the recursion is reduced from order 4 to order 2, which significantly reduces computational requirements. Additionally, the structure of error covariance matrix $P^{-1}$ allows the 3×2 STC symbol-pair decoding process 800 to symbol-pair decode symbols in STC matrix S of Equation (48) by computing only the diagonal elements of error covariance matrix $P^{-1}$.

FIG. 8 depicts an example 3×2 STC symbol-pair decoding process 800. Process 800 also depicts the macs for each operation. Operation 802 determines the channel matrix H from (52) [6 macs]. Operation 804 determines A and determines $\gamma_a$ from (56) [4 macs]. Operation 806 determines B and determines $\gamma_b$ from (41) [2 macs]. Operation 808 determines elements of C, $\alpha_1$, and $\alpha_2$ from (59) and (60), respectively [4 macs]. Operation 810 determines $C^H C$ and determines $\gamma_c$ from (33) [2 macs]. Operation 812 determines $\tilde{H}^H y$ [16 macs].

As with 4×2 STC symbol-pair decoding process 500, to minimize quality losses, in at least one embodiment, the 3×2 STC symbol-pair decoding process 800 first decodes the symbol pair s in a particular order in accordance with a one or more metrics. The particular metric or metrics are a matter of design choice. In at least one embodiment, STC symbol-pair decoder 304 decodes the symbol pair first that corresponds to the highest received SNR, the lowest error covariance, the highest SNR plus interference ratio, or some other performance measure as determined by design choice. Thus, assuming that $\gamma_b > \gamma_a$, and, thus, $(s_7, s_8)$ are decoded first, then 3×2 STC symbol-pair decoding process 800 determines $(\hat{s}_7, \hat{s}_8)$ as follows:

$$\begin{pmatrix} \hat{s}_7 \\ \hat{s}_8 \end{pmatrix} = (-D^{-1} C^H A^{-1} D^{-1}) \tilde{H}^H y \quad (61)$$

$$= \frac{1}{\gamma} \begin{pmatrix} -\alpha_1^* & \alpha_2 & \gamma_a & 0 \\ -\alpha_2^* & -\alpha_1 & 0 & \gamma_a \end{pmatrix} \tilde{H}^H y \quad (62)$$

The estimated symbols $\hat{s}_7$ and $\hat{s}_8$ are then quantized to obtain $(\tilde{s}_7, \tilde{s}_8)$. The particular quantization process is a matter of design choice. In at least one embodiment, STC symbol-pair decoder 304 maps estimated symbols $\hat{s}_7$ and $\hat{s}_8$ to a QPSK constellation.

The contribution of the decoded pairs are removed from the estimated received signal vector $\tilde{y}$ to obtain the reduced order problem:

$$y^{(2)} = y - \tilde{h}_3 \tilde{s}_7 - \tilde{h}_4 \tilde{s}_8 \quad (63)$$

$$= \tilde{H}^{(2)} s^{(2)} + n$$

$$= [\tilde{h}_1 \tilde{h}_2] s^{(2)} + n$$

$$= \begin{pmatrix} h_1 & h_2 \\ h_2^* & -h_1^* \\ h_5 & h_6 \\ h_6^* & -h_5^* \end{pmatrix} \begin{pmatrix} s_7 \\ s_8 \end{pmatrix} + n.$$

If $\gamma_a > \gamma_b$, then the symbol pair $(s_1, s_2)$ is decoded first following the same pattern as the 4×2 STC symbol-pair decoding process 500 and the 3×2 symbol-pair decoding process 800.

Operation 814 determines $\gamma$ from (34) [1 macs]. Operation 816 determines $(\tilde{s}_7, \tilde{s}_8)$ from (62) (ignoring the scaling constant) [6 macs]. Operation 818 quantizes $(\tilde{s}_7, \tilde{s}_8)$ by scaling constellation by $\gamma$ [3×2=6 macs at most for 64 quadrature amplitude modulation]. Operation 820 determines $y^{(2)}$ from (39) [8 macs]. Operation 822 determines $(\tilde{s}_1, \tilde{s}_2)$ from (40) [8 macs].

This changes 3×2 STC symbol-pair decoding process 800 from process 500 slightly as follows: 6 macs for computing H—see (52), 2 macs instead of 4—see (56) and (57), and 4 macs instead of 8—see (31), (32), (59), and (60).

The total MACs remains the same between 4×2 STC symbol-pair decoding process 500 and 3×2 STC symbol-pair decoding process 800.

Note that $s_i$, i=1, . . . , 8 can be obtained from $\tilde{s}_i$, i=1, . . . , 8 from a simple linear mapping obtained from (49) and (50). For example $\tilde{s}_1$ gives $s_{1I}$ and $s_{3Q}$, which can be incorporated into logic of an arithmetic logic unit (ALU) logic of STC symbol-pair decoder 304 by appropriately mapping the real and imaginary parts.

Figure 9:
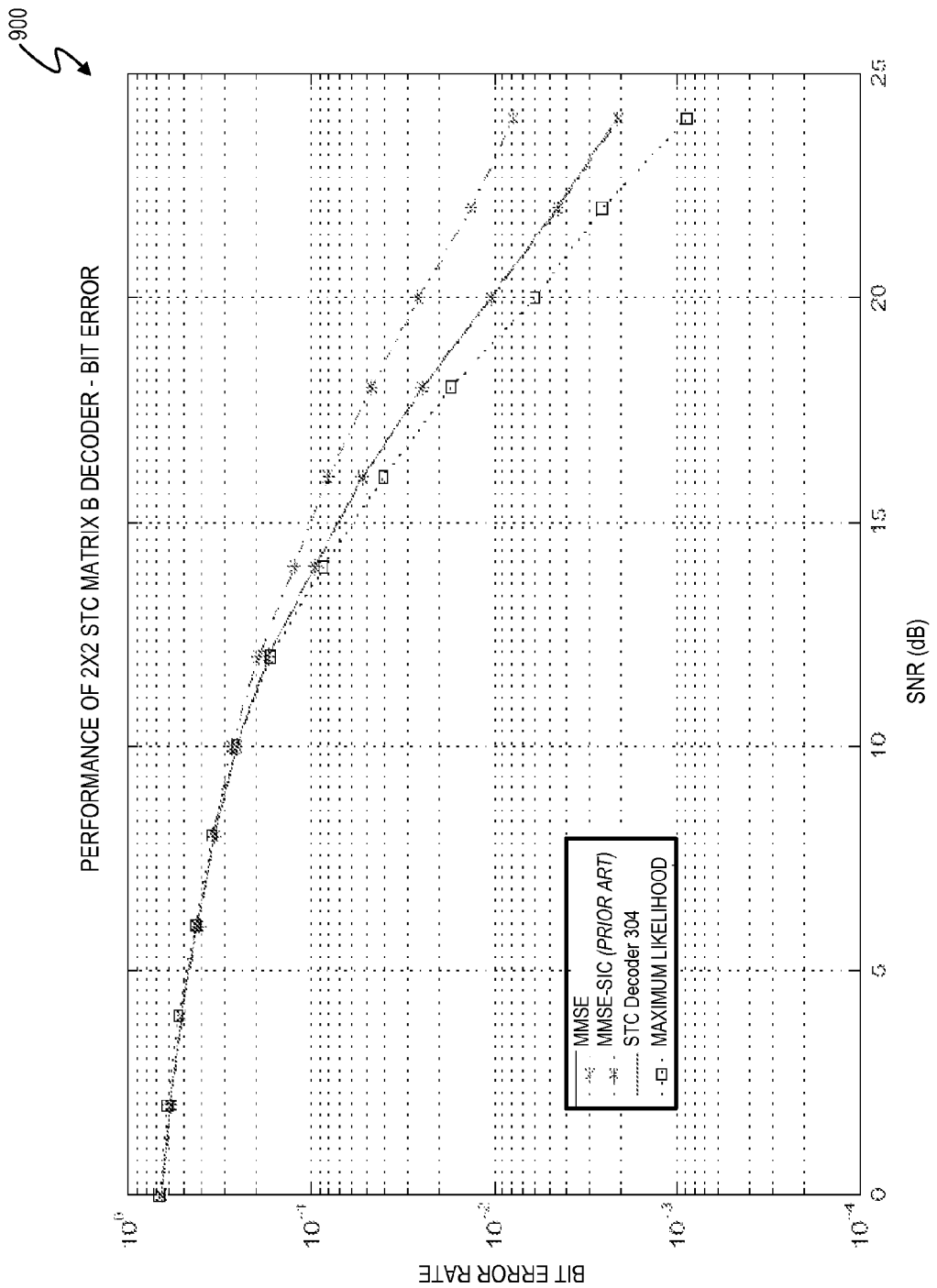
FIG. 9 depicts a 3×2 MIMO matrix B—Bit-error-rate comparison of MMSE, MMSE-SIC and maximum likelihood (ML) decoders with an STC symbol-pair decoder
Figure 10:
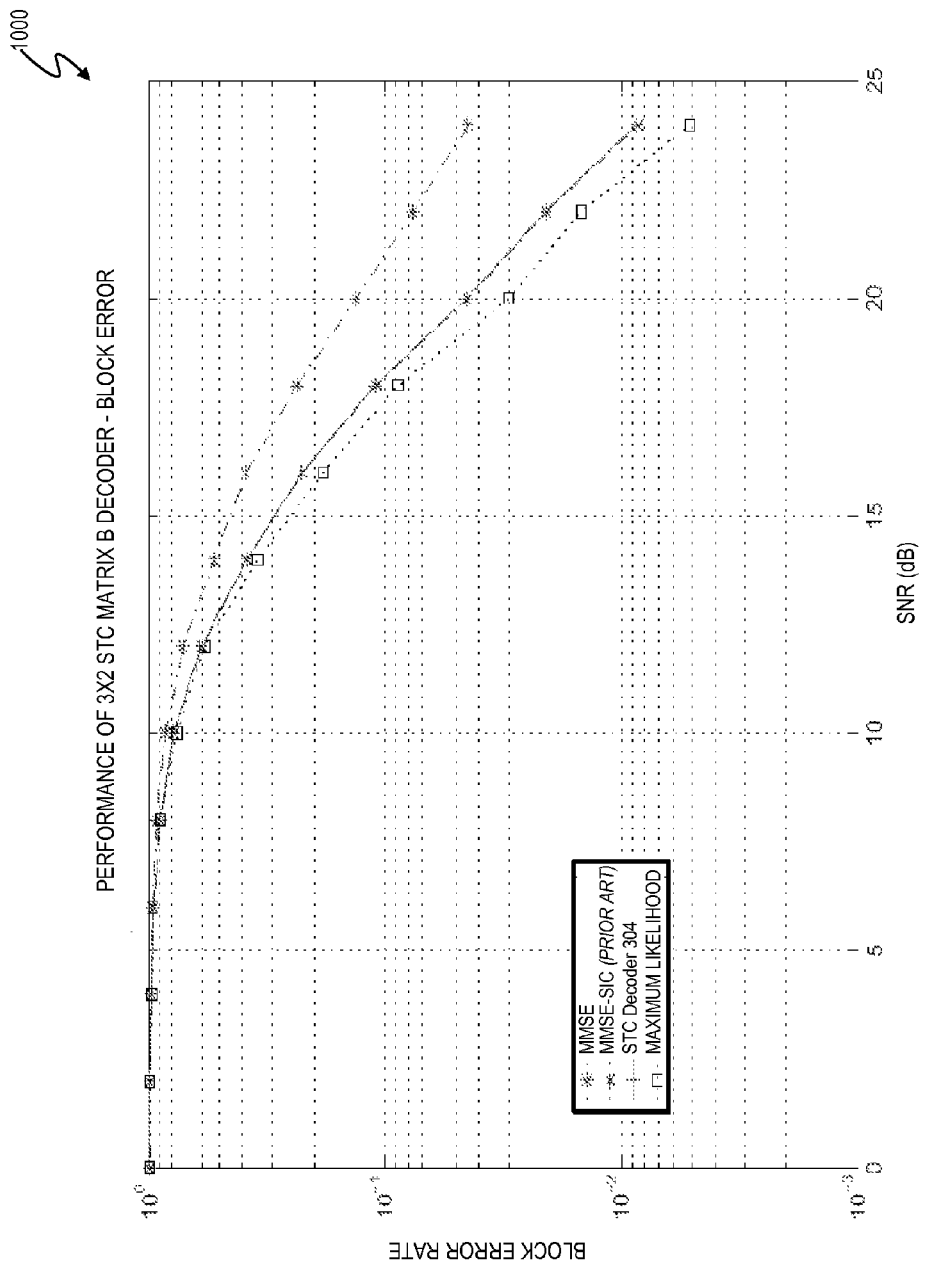
FIG. 10 depicts a 3×2 MIMO matrix B—Block-error-rate comparison of MMSE, MMSE-SIC and ML decoders with an STC symbol-pair decoder.

FIG. 9 depicts a comparison/performance chart 900 for a 3×2 MIMO matrix B—Bit-error-rate comparison of MMSE, MMSE-SIC and maximum likelihood (ML) decoders with the STC symbol-pair decoder 304. FIG. 10 depicts a comparison/performance chart 1000 for a 3×2 MIMO matrix B—Block-error-rate comparison of MMSE, MMSE-SIC and ML decoders with STC symbol-pair decoder 304. Referring to FIGS. 9 and 10, simulations of 3×2 STC symbol-pair decoding process 800 have been conducted under similar conditions as with 4×2 STC symbol-pair decoding process 500 and FIGS. 6 and 7. Again, encoder 302 has negligible loss compared to the MMSE-SIC decoder even though the symbols are decoded and canceled in pairs instead of symbol by symbol detection and cancellation as in the MMSE-SIC. Thus, STC symbol-pair decoder 304 provides a considerable complexity advantage for a negligible performance loss for all SNR considered.

Compared to the MMSE decoder, the advantage of using successive interference cancellation is clear, i.e. the gain is about 3 dB at $10^{-2}$ BER. In addition, the MMSE-SIC and MMSE-SIC-2 decoders have a 1 dB loss compared to the (optimal) ML detector at $10^{-2}$ BER and 2.25 dB at $10^{-3}$ BER.

Assuming an operating point of $10^{-2}$, the STC symbol-pair decoder 304 decoder using successive interference cancellation is within 1 dB of the optimal detector.

Decoder for 2×2 MIMO Matrix C STC

FIG. 11 depicts a 2×2 STC symbol-pair decoding process 1100. The 2×2 STC symbol-pair decoding process 1100 uses an estimate of the data symbols to facilitate symbol-pair symbol decoding. The 2×2 STC symbol-pair decoding process 1100 uses the received symbols to determine the order of pair decoding, which results in a very small SNR reduction.

Referring to FIGS. 3 and 11, STC pair decoder 304 can also be, for example, configured to decode a 2×2 MIMO STC matrix S. For a 2×2 MIMO STC matrix S, the signal Y received by subscriber station 104 is represented by:

$$y = Hs + N \tag{64}$$

where:

$$Y = \begin{pmatrix} y_1 & y_2 \\ y_3 & y_4 \end{pmatrix}, H = \begin{pmatrix} h_1 & h_2 \\ h_3 & h_4 \end{pmatrix}, \tag{65}$$

$$S = \frac{1}{\sqrt{1+r^2}} \begin{pmatrix} s_1 + irs_4 & rs_2 + s_3 \\ s_2 - rs_3 & irs_1 + s_4 \end{pmatrix} r = \frac{-1+\sqrt{5}}{2}.$$

The received signal Y can be written in vector form as:

$$y = Hs + n \tag{66}$$

where:

$$y = \begin{pmatrix} y_1 \\ y_2 \\ y_3 \\ y_4 \end{pmatrix}; H = \frac{1}{\sqrt{1+r^2}} \begin{pmatrix} h_1 & h_2 & -rh_2 & irh_1 \\ irh_2 & rh_1 & h_1 & h_2 \\ h_3 & h_4 & -rh_4 & irh_3 \\ irh_4 & rh_3 & h_3 & h_4 \end{pmatrix}; s = \begin{pmatrix} s_1 \\ s_2 \\ s_3 \\ s_4 \end{pmatrix}. \tag{67}$$

To put Equation (56) in a form to perform symbol-pair decoding, STC symbol-pair decoder 304 linearly maps vector s as:

$$\tilde{s}_1 = \frac{1}{\sqrt{1+r^2}}(s_1 + irs_4), \tilde{s}_2 = \frac{1}{\sqrt{1+r^2}}(rs_2 + s_3), \tag{68}$$

$$\tilde{s}_3 = \frac{1}{\sqrt{1+r^2}}(s_2 - rs_3), \tilde{s}_4 = \frac{1}{\sqrt{1+r^2}}(irs_1 + s_4).$$

The estimated received vector y is represented by:

$$y = \tilde{H}\tilde{s} + n \tag{69}$$

$$y = \begin{pmatrix} y_1 \\ y_2 \\ y_3 \\ y_4 \end{pmatrix}; \tilde{H} = \begin{pmatrix} h_1 & 0 & h_2 & 0 \\ 0 & h_1 & 0 & h_2 \\ h_3 & 0 & h_4 & 0 \\ 0 & h_3 & 0 & h_4 \end{pmatrix}; \tilde{s} = \begin{pmatrix} \tilde{s}_1 \\ \tilde{s}_2 \\ \tilde{s}_3 \\ \tilde{s}_4 \end{pmatrix}.$$

For the 2×2 symbol matrix S, STC symbol-pair decoder 304 first decodes $\tilde{s}_i$, i=1, . . . , 4 and then solves for $s_i$, i=1, . . . , 4 as follows $$s_1 = \frac{1}{\sqrt{1+r^2}}(\tilde{s}_1 - ir\tilde{s}_4), s_4 = \frac{1}{\sqrt{1+r^2}}(-ir\tilde{s}_1 + \tilde{s}_4) \tag{70}$$

$$s_2 = \frac{1}{\sqrt{1+r^2}}(r\tilde{s}_2 + \tilde{s}_3), s_3 = \frac{1}{\sqrt{1+r^2}}(\tilde{s}_2 - r\tilde{s}_3). \tag{71}$$

Note that $$s = U\tilde{s}; U = \frac{1}{\sqrt{1+r^2}} \begin{pmatrix} 1 & 0 & 0 & -ir \\ 0 & r & 1 & 0 \\ 0 & 1 & -r & 0 \\ -ir & 0 & 0 & 1 \end{pmatrix} \tag{72}$$

where U is a unitary matrix. Additionally:

$$y = \overline{H}s + n = \overline{H}U^H\tilde{s} + n = \tilde{H}\tilde{s} + n, \text{ and} \tag{73}$$

$$\tilde{H} = \overline{H}U^H. \tag{74}$$

The error covariance matrices in the two cases are related as:

$$P^{-1} = (I + \overline{H}^H\overline{H})^{-1} = (I + U^H\tilde{H}^H\tilde{H}U)^{-1} = U^H(I + \tilde{H}^H\tilde{H})^{-1}U. \tag{75}$$

The first two diagonal elements of the error covariance matrix $P^{-1}$ are:

$$d_1 = r^2(|h_1|^2 + |h_3|^2) + |h_2|^2 + |h_4|^2 + \sigma^2(1+r^2) = r^2\gamma_a + \gamma_b \tag{76}$$

$$d_2 = |h_1|^2 + |h_3|^2 + r^2(|h_2|^2 + |h_4|^2) + \sigma^2(1+r^2) = \gamma_a + r^2\gamma_b \tag{77}$$

where $\gamma_a$ and $\gamma_b$ are defined in (78) and (79).

The matrix $P = I + \tilde{H}^H\tilde{H}$ is of the form of (21) where $$A = \gamma_a I_2; \gamma_a = \tilde{\gamma}_a + \sigma^2; \tilde{\gamma}_a = |h_1|^2 + |h_3|^2, \tag{78}$$

$$B = \gamma_b I_2; \gamma_b = \tilde{\gamma}_b + \sigma^2; \tilde{\gamma}_b = |h_2|^2 + |h_4|^2, \tag{79}$$

$$C = \alpha I_2; \alpha = h_1^* h_2 + h_3^* h_4, \tag{80}$$

$$C^H C = \gamma_c I_2; \gamma_c = |\alpha^2|, \text{ and} \tag{81}$$

$$\gamma = \gamma_a\gamma_b - \gamma_c. \tag{82}$$

$P^{-1}$ can be obtained from (23).

The STC symbol-pair decoder 304 first determines the MMSE estimate of $\tilde{s}$ using:

$$\hat{s} = (I + \tilde{H}^H \tilde{H})^{-1} \tilde{H}^H y \qquad (83)$$

$$= \frac{1}{\gamma} \begin{pmatrix} \gamma_b & 0 & -\alpha_1 & 0 \\ 0 & \gamma_b & 0 & -\alpha_1^* \\ -\alpha_1^* & 0 & \gamma_a & 0 \\ 0 & -\alpha_1 & 0 & \gamma_a \end{pmatrix} \tilde{H}^H y. \qquad (84)$$

The next step in decoding the 2×2 STC matrix S differs from the 4×2 STC symbol-pair decoding process 500 in the pairs that are decoded. To derive the pairs and order of decoding, STC symbol-pair decoder 304 examines the non-mapped, original matrices in (67) again. Note that the error covariance matrix $P^{-1}$ of the estimate ŝ has the form (75). This implies that the errors of the pair of $s_1$ and $s_3$ are the same and similarly for the pair of $s_2$ and $s_4$. Thus, the decoding order for a 2×2 STC matrix S is to decode the symbol pair having the lowest mean squared error (MSE) first. This pair with the lowest MSE is obtained by examining the first two or last two diagonal elements of $(I+\tilde{H}^H\tilde{H})^{-1}$ calculated in (76) and (77). The decoding order is:

If $d_1 > d_2$ from (76) and (77), respectively, decode the pair $(s_1, s_3)$ first; otherwise decode the pair $(s_2, s_4)$ first.

For example, assuming that $d_1 > d_2$. Then the estimates of $(s_1, s_3)$ are obtained from the estimated $\tilde{s}$ using (70). Symbols $(s_1, s_3)$ are then quantized to the constellation to which they belong, for example, QPSK. The contribution of $(s_1, s_3)$, e.g. the quantized values of the estimates of $(s_1, s_3)$, are removed from the observation $\tilde{y}$ to obtain the reduced order problem:

$$y^{(2)} = y - h_1 s_1 - h_3 s_3 \qquad (85)$$

$$= H^{(2)} s^{(2)} + n$$

$$= \frac{1}{\sqrt{1+r^2}} \begin{pmatrix} h_2 & irh_1 \\ rh_1 & h_2 \\ h_4 & irh_3 \\ rh_3 & h_4 \end{pmatrix} \begin{pmatrix} s_2 \\ s_4 \end{pmatrix} + n. \qquad (86)$$

The STC symbol-pair decoder 304 continues the decoding process by obtaining an MMSE estimate of $(s_2, s_4)$:

$$\hat{s}^{(2)} = (I + H^{(2)H} H^{(2)})^{-1} H^{(2)H} y^{(2)}, \qquad (87)$$

$$= (1+r^2) \begin{pmatrix} a_2 & c \\ c^* & a_2 \end{pmatrix}^{-1} H^{(2)H} y^{(2)}, \qquad (88)$$

$$= \frac{(1+r^2)}{\beta} \begin{pmatrix} a_2 & -c \\ -c^* & a_2 \end{pmatrix} H^{(2)H} y^{(2)}, \text{ and} \qquad (89)$$

$$= \frac{(\sqrt{1+r^2})}{\beta} \begin{pmatrix} a_2 & -c \\ -c^* & a_2 \end{pmatrix} \begin{pmatrix} h_2 & irh_1 \\ rh_1 & h_2 \\ h_4 & irh_3 \\ rh_3 & h_4 \end{pmatrix}^H \tilde{y}^{(2)}, \qquad (90)$$

where $\beta = a_2^2 + |c|^2$. \qquad (91)

Assuming $d_2 > d_1$, then the estimates of $(s_2, s_4)$ are obtained from the estimated $\tilde{s}$ using (71). These symbols $(s_2, s_4)$ are then quantized to the constellation to which they belong, for example, QPSK. The contribution of $(s_2, s_4)$, e.g. the quantized values of the estimates of $(s_2, s_4)$, are removed from the estimated received signal vector $\tilde{y}$ to obtain the reduced order problem:

$$y^{(2)} = y - h_2 s_2 - h_4 s_4 \qquad (92)$$

$$= H^{(2)} s^{(2)} + n, \text{ and}$$

$$= \frac{1}{\sqrt{1+r^2}} \begin{pmatrix} h_1 & -rh_2 \\ irh_2 & h_1 \\ h_3 & -rh_4 \\ irh_4 & h_3 \end{pmatrix} \begin{pmatrix} s_1 \\ s_3 \end{pmatrix} + n. \qquad (93)$$

The decoding proceeds by obtaining a MMSE estimate of $(s_1, s_3)$, $$\hat{s}^{(2)} = (I + H^{(2)H} H^{(2)})^{-1} H^{(2)H} y^{(2)}, \text{ and} \qquad (94)$$

$$= \frac{(\sqrt{1+r^2})}{\beta} \begin{pmatrix} a_1 & c \\ c^* & a_1 \end{pmatrix} \begin{pmatrix} h_1 & -rh_2 \\ irh_2 & h_1 \\ h_3 & -rh_4 \\ irh_4 & h_3 \end{pmatrix}^H y^{(2)}, \text{ where}$$

$$\beta = a_1^2 + |c|^2. \qquad (95)$$

One embodiment of the 2×2 STC symbol-pair decoding process 1100 is described below. The details of each operation are referenced to the foregoing equation numbers and associated description. The associated mac number is also included. Operation 1102 determines A and determines $\gamma_a$ from (78) [2 macs]. Operation 1104 determines B and determines $\gamma_b$ from (79) [2 macs]. Operation 1106 determines C and determines α from (80) [2 macs]. Operation 1108 determines $C^H C$ and determines $\gamma_c$ [1 mac]. Operation 1110 determines $\tilde{H}^H y$ from (69) [8 macs]. Operation 1112 determines γ from (82) [1 mac]. Operation 1114 determines ŝ from (83) (ignoring constant 1/λ) [8 macs]. Operation 1116 determines $d_1$ from (76) [1 mac]. Operation 1118 determines $d_2$ from (65) [1 mac].

To reduce SNR loss, 2×2 STC symbol-pair decoding process 1100 orders the pair decoding using a metric, such as the pair with the minimum mean squared error, from the estimated channel matrix. The particular ordering metric is a matter of design choice.

If $d_2 > d_1$, then 2×2 STC symbol-pair decoding process 1100 performs operations 1120-1132. Operation 1120 determines $(\hat{s}_1, \hat{s}_3)$ using (70) but ignoring constant $1/\sqrt{1+r^2}$ [2 macs]. Operation 1122 quantizes $(\hat{s}_1, \hat{s}_3)$ by scaling constellation by $\gamma \cdot \sqrt{1+r^2}$ [1+3×2=7 macs (max for 64 QAM). Operation 1124 determines $y^{(2)}$ from (85) [8 macs]. Operation 1126 determines $H^{(2)H} y^{(2)}$, where $H^{(2)H}$ is defined in (86), but ignoring the constant $1/\sqrt{1+r^2}$ [8 macs]. Operation 1128 determines β from (77) [1 mac]. Operation 1130 then determines $\hat{s}^{(2)}$ from (87) ignoring constant 1/β [4+2=6 macs]. Operation 1132 quantizes $(\hat{s}_2, \hat{s}_4)$ by scaling constellation by β [3×2=6 macs (max [for 64 QAM)]. The 2×2 STC symbol-pair decoding process 1100 then repeats for the next set of data symbols.

If $d_1 > d_2$, then operation 1134 determines $(\hat{s}_2, \hat{s}_4)$ using (70) but ignoring constant $1/\sqrt{1+r^2}$ [2 macs]. Operation 1136 quantizes $(\hat{s}_2, \hat{s}_4)$ by scaling constellation by $\gamma \cdot \sqrt{1+r^2}$ [1+3× 2=7 macs (max for 64 QAM). Operation 1138 determines $y^{(2)}$ from (78) [8 macs]. Operation 1140 determines $H^{(2)H} y^{(2)}$, where $H^{(2)H}$ is defined in (93), but ignoring the constant $1/\sqrt{1+r^2}$ [8 macs]. Operation 1142 determines β from (81) [1 mac]. Operation 1144 determines $\hat{s}^{(2)}$ from (94) ignoring constant $1/\beta$ [4+2=6 macs]. Operation 1146 quantizes $(\hat{s}_1, \hat{s}_3)$ by scaling constellation by $\beta$ [3×2=6 macs (max [for 64 QAM)].

Figure 12:
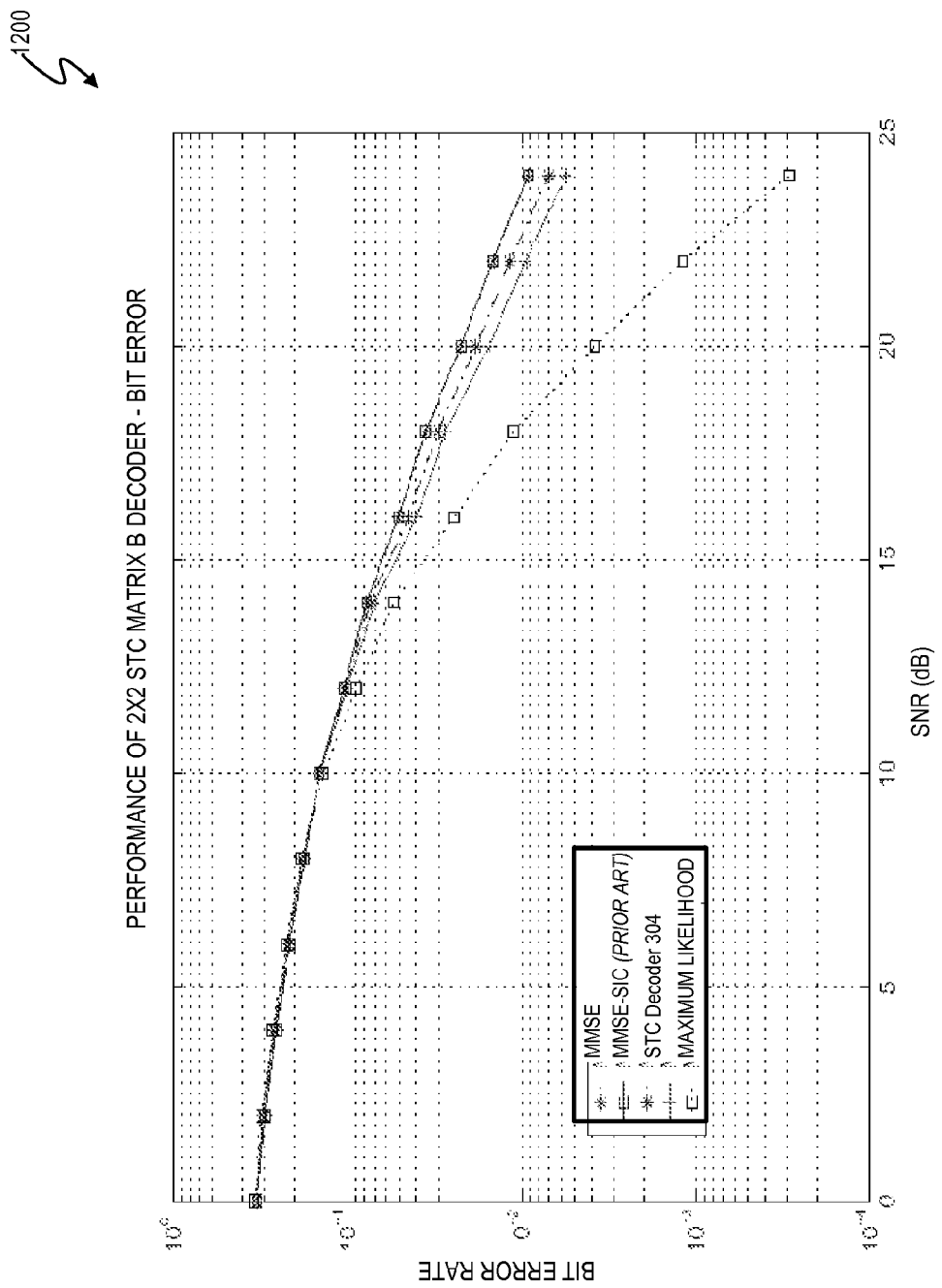
FIG. 12 depicts for a 2×2 MIMO matrix B—Bit-error-rate comparison of MMSE, MMSE-SIC and ML decoder with an STC symbol-pair decoder.
Figure 13:
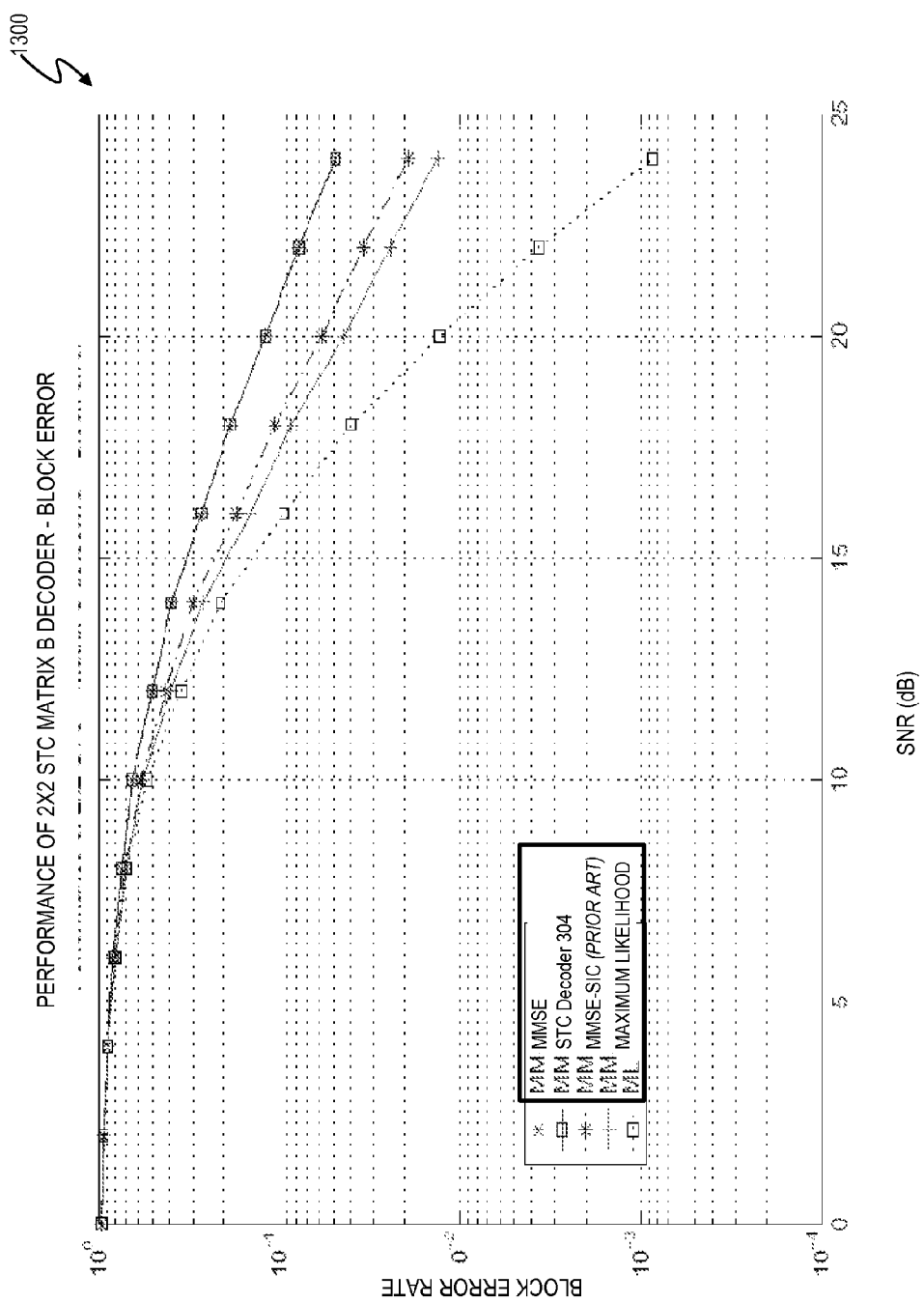
FIG. 13 depicts for a 2×2 MIMO matrix B—Block-error-rate comparison of MMSE, MMSE-SIC and ML decoders with an STC symbol-pair decoder.
Figure 14:
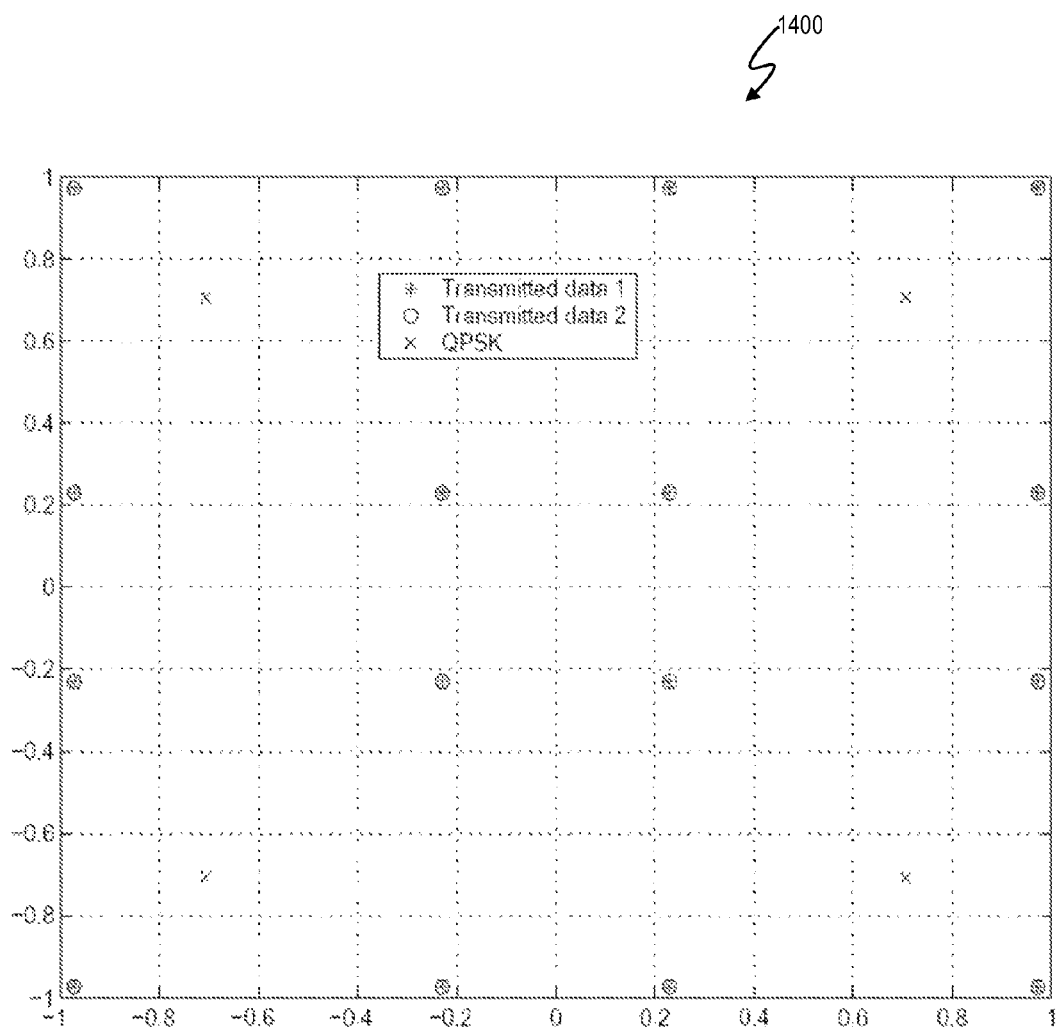
FIG. 14 depicts a mapping of a QPSK constellation to actual transmitted symbols s.

FIG. 12 depicts for a comparison/performance chart 1200 for a 2×2 MIMO matrix B—Bit-error-rate comparison of MMSE, MMSE-SIC and ML decoder with STC symbol-pair decoder 304 referenced as MMSE-SIC-2. FIG. 13 depicts for a comparison/performance chart 1300 for a 2×2 MIMO matrix B—Block-error-rate comparison of MMSE, MMSE-SIC and ML decoders with STC symbol-pair decoder 304 referenced as MMSE-SIC-2. The 2×2 STC pair decoder 304 proposed detector, denoted as MMSE-SIC-2, looses about 0.75 dB compared to MMSE-SIC and about 4 dB compared to the ML detector and gains 1 dB over the MMSE detector at $10^{-2}$ BER. The high loss of the MMSE-SIC detectors over the ML detectors can be attributed to the STC being used. The STC maps the symbols $s_1, \ldots, s_4$ to transmitted data which belong to a higher constellation size. As an example, QPSK symbols are mapped to a 16-point constellation (16-QAM) 1400 as shown in FIG. 14. The detection regions in this mapping are smaller—which contribute to the higher errors in the MMSE type detectors. The region of interest corresponding to $10^{-2}$ BER is from 18-22 dB in the BER curves. In this region, observe that the performance loss of MMSE-SIC detectors is about 2.5-3 dB in terms of Block error rates, compared to the 4 dB loss in terms of BER.

Accordingly, the MIMO wireless communication system and method with STC pair decoder 304 reduces the number of recursive operations when decoding received data symbols by decoding the data symbols in pairs rather than on a per symbol basis without sacrificing signal quality.

Although the present invention has been described in detail, it should be understood that various changes, substitutions and alterations can be made hereto without departing from the spirit and scope of the invention as defined by the appended claims.

What is claimed is:

1. A method for decoding space time codes in a wireless multiple input, multiple output (MIMO) communication system, the method comprising:
   receiving a signal Y on r antennas, wherein r is an integer greater than one (1), wherein Y comprises a plurality of encoded data symbols s, s is encoded using a space time code matrix S, $s=\{s_1, s_2, s_3, \ldots s_T\}$, and T represents a number of data symbols received during a time t; and
   decoding the received signal Y using pairs of encoded data symbols;
   wherein the MIMO communication system is a 3×2 MIMO system and the space time code matrix S comprises:

$$\bar{S} = \begin{pmatrix} \sqrt{\frac{3}{4}} & 0 & 0 \\ 0 & \sqrt{\frac{3}{4}} & 0 \\ 0 & 0 & \sqrt{\frac{3}{2}} \end{pmatrix} \begin{pmatrix} \tilde{s}_1 & -\tilde{s}_2^* & \tilde{s}_5 & -\tilde{s}_6^* \\ \tilde{s}_2 & \tilde{s}_1^* & \tilde{s}_6 & \tilde{s}_5^* \\ \tilde{s}_7 & -\tilde{s}_8^* & \tilde{s}_3 & -\tilde{s}_4^* \end{pmatrix}; \text{ and}$$

wherein $\tilde{s}_1 = s_{1I} + js_{3Q}$; $\tilde{s}_2 = s_{2I} + js_{4Q}$; $\tilde{s}_3 = s_{3I} + js_{1Q}$; $\tilde{s}_4 = s_{4I} + js_{2Q}$, $\tilde{s}_5 = s_{5I} + js_{7Q}$; $\tilde{s}_6 = s_{6I} + js_{8Q}$; $\tilde{s}_7 = s_{7I} + js_{5Q}$; $\tilde{s}_8 = s_{8I} + js_{6Q}$, $s_i = s_{iI} + js_{iQ}$, and the subscripts "I" and "Q" refer to the real and imaginary parts, respectively, of the complex value $s_i$.

2. The method of claim 1 further comprising:
   (a) identifying one of the pairs $\{s_a, s_b\}$ of data symbols s from T/2 pairs from data symbols s, wherein $s_a \in \{s_1, s_2, s_3, \ldots s_T\}$ and $s_b \in \{s_1, s_2, s_3, \ldots s_T\}$;
   (b) decoding the identified pair $\{s_a, s_b\}$ of data symbols before decoding any remaining pair of data symbols s;
   (c) removing a contribution of the decoded pair $\{s_a, s_b\}$ from Y; and
   repeating steps (a) through (c) for remaining pairs of data symbols until all T/2 pairs from data symbols s are decoded.

3. The method of claim 2 wherein identifying one of the pairs $\{s_a, s_b\}$ of data symbols s further comprises identifying one of the pairs $\{s_a, s_b\}$ of data symbols s having a highest signal-to-noise plus interference ratio.

4. The method of claim 2 further comprising:
   quantizing the decoded pair of data symbols to obtain the contribution in step (c).

5. The method of claim 1 wherein decoding the received signal Y further comprises:
   determining a minimum mean-square estimation of the data symbols s.

6. A wireless multiple input, multiple output (MIMO) communication system comprising:
   a receiver having r antennas to receive a signal Y, wherein r is an integer greater than one (1), wherein Y comprises a plurality of encoded data symbols s, s is encoded using a space time code matrix S, $s=\{s_1, s_2, s_3, \ldots s_T\}$, and T represents a number of data symbols received during a time t; and
   a decoder, coupled to the receiver, to decode the received signal Y using pairs of encoded data symbols;
   wherein the MIMO communication system is a 3×2 MIMO system and the space time code matrix S comprises:

$$\bar{S} = \begin{pmatrix} \sqrt{\frac{3}{4}} & 0 & 0 \\ 0 & \sqrt{\frac{3}{4}} & 0 \\ 0 & 0 & \sqrt{\frac{3}{2}} \end{pmatrix} \begin{pmatrix} \tilde{s}_1 & -\tilde{s}_2^* & \tilde{s}_5 & -\tilde{s}_6^* \\ \tilde{s}_2 & \tilde{s}_1^* & \tilde{s}_6 & \tilde{s}_5^* \\ \tilde{s}_7 & -\tilde{s}_8^* & \tilde{s}_3 & -\tilde{s}_4^* \end{pmatrix}; \text{ and}$$

wherein $\tilde{s}_1 = s_{1I} + js_{3Q}$; $\tilde{s}_2 = s_{2I} + js_{4Q}$; $\tilde{s}_3 = s_{3I} + js_{1Q}$; $\tilde{s}_4 = s_{4I} + js_{2Q}$, $\tilde{s}_5 = s_{5I} + js_{7Q}$; $\tilde{s}_6 = s_{6I} + js_{8Q}$; $\tilde{s}_7 = s_{7I} + js_{5Q}$; $\tilde{s}_8 = s_{8I} + js_{6Q}$, $s_i = s_{iI} + js_{iQ}$, and the subscripts "I" and "Q" refer to the real and imaginary parts, respectively, of the complex value $s_i$.

7. The system of claim 6 wherein the decode includes components to:
   (a) identify one of the pairs $\{s_a, s_b\}$ of data symbols s from T/2 pairs from data symbols s, wherein $s_a \in \{s_1, s_2, s_3, \ldots s_T\}$ and $s_b \in \{s_1, s_2, s_3, \ldots s_T\}$;
   (b) decode the identified pair $\{s_a, s_b\}$ of data symbols before decoding any remaining pair of data symbols s;
   (c) remove a contribution of the decoded pair $\{s_a, s_b\}$ from Y; and
   repeat steps (a) through (c) for remaining pairs of data symbols until all T/2 pairs from data symbols s are decoded.

8. The system of claim 7 wherein the components to identify one of the pairs $\{s_a, s_b\}$ of data symbols s further comprises components to identify one of the pairs $\{s_a, s_b\}$ of data symbols s having a highest signal-to-noise ratio from among the T/2 pairs.

9. The system of claim 6 further comprising:
a quantizer to quantize the decoded pair of data symbols to obtain the contribution in step (c).

10. The system of claim 6 wherein to decode the received signal Y further comprises components to determine a minimum mean-square estimation of the data symbols s.

11. A method for decoding space time codes in a wireless multiple input, multiple output (MIMO) communication system, the method comprising:
receiving a signal Y on r antennas, wherein r is an integer greater than one (1), wherein Y comprises a plurality of encoded data symbols s, s is encoded using a space time code matrix S, $s=\{s_1, s_2, s_3, \ldots s_T\}$, T represents a number of data symbols received during a time t, and Y=HS+N, wherein H represents a channel matrix and N represents interference;
(a) selecting a pair of data symbols to decode;
(b) decoding the selected pair of data symbols;
(c) removing a contribution of the decoded data symbols from the signal Y;
repeating steps (a), (b), and (c) for remaining pairs of symbols in the space time code matrix S; and
when T is odd, decoding a remaining symbol in the received signal Y;
wherein the MIMO communication system is a 3×2 MIMO system and the space time code matrix S comprises:

$$\bar{S} = \begin{pmatrix} \sqrt{\frac{3}{4}} & 0 & 0 \\ 0 & \sqrt{\frac{3}{4}} & 0 \\ 0 & 0 & \sqrt{\frac{3}{2}} \end{pmatrix} \begin{pmatrix} \tilde{s}_1 & -\tilde{s}_2^* & \tilde{s}_5 & -\tilde{s}_6^* \\ \tilde{s}_2 & \tilde{s}_1^* & \tilde{s}_6 & \tilde{s}_5^* \\ \tilde{s}_7 & -\tilde{s}_8^* & \tilde{s}_3 & -\tilde{s}_4^* \end{pmatrix}; \text{ and}$$

wherein $\tilde{s}_1 = s_{1I} + js_{3Q}$; $\tilde{s}_2 = s_{2I} + js_{4Q}$; $\tilde{s}_3 = s_{3I} + js_{1Q}$; $\tilde{s}_4 = s_{4I} + js_{2Q}$; $\tilde{s}_5 = s_{5I} + js_{7Q}$; $\tilde{s}_6 = s_{6I} + js_{8Q}$; $\tilde{s}_7 = s_{7I} + js_{5Q}$; $\tilde{s}_8 = s_{8I} + js_{6Q}$, $s_i = s_{iI} + js_{iQ}$, and the subscripts "I" and "Q" refer to the real and imaginary parts, respectively, of the complex value $s_i$.

12. The method of claim 11 wherein the channel matrix H is a biorthogonal, estimated channel matrix.

13. The method of claim 11 wherein the channel matrix H is a non-biorthogonal, estimated channel matrix, the method further comprising:
estimating the data symbols to generate pairs of data symbols, wherein error covariances of data symbols in a pair are approximately identical.

14. The method of claim 11 further comprising:
quantizing the decoded pair of data symbols to obtain the contribution in step (c).

15. A method for decoding space time codes in a wireless multiple input, multiple output (MIMO) communication system, the method comprising:
receiving a signal Y on r antennas, wherein r is an integer greater than one (1), wherein Y comprises a plurality of encoded data symbols s, s is encoded using a space time code matrix S, $s=\{s_1, s_2, s_3, \ldots s_T\}$, and T represents a number of data symbols received during a time t; and
decoding the received signal Y using pairs of encoded data symbols;
wherein the MIMO communication system is a 2×2 MIMO system and the space time code matrix S comprises:

$$S = \frac{1}{\sqrt{1+r^2}} \begin{pmatrix} s_1 + irs_4 & rs_2 + s_3 \\ s_2 - rs_3 & irs_1 + s_4 \end{pmatrix}; \text{ and}$$

$$r = \frac{-1+\sqrt{5}}{2}.$$

16. The method of claim 15 further comprising:
(a) identifying one of the pairs $\{s_a, s_b\}$ of data symbols s from T/2 pairs from data symbols s, wherein $s_a \in \{s_1, s_2, s_3, \ldots s_T\}$ and $s_b \in \{s_1, s_2, s_3, \ldots s_T\}$;
(b) decoding the identified pair $\{s_a, s_b\}$ of data symbols before decoding any remaining pair of data symbols s;
(c) removing a contribution of the decoded pair $\{s_a, s_b\}$ from Y; and
repeating steps (a) through (c) for remaining pairs of data symbols until all T/2 pairs from data symbols s are decoded.

17. The method of claim 16 wherein identifying one of the pairs $\{s_a, s_b\}$ of data symbols s further comprises identifying one of the pairs $\{s_a, s_b\}$ of data symbols s having a highest signal-to-noise plus interference ratio.

18. The method of claim 16 further comprising:
quantizing the decoded pair of data symbols to obtain the contribution in step (c).

19. The method of claim 15 wherein decoding the received signal Y further comprises:
determining a minimum mean-square estimation of the data symbols s.

20. A wireless multiple input, multiple output (MIMO) communication system comprising:
a receiver having r antennas to receive a signal Y, wherein r is an integer greater than one (1), wherein Y comprises a plurality of encoded data symbols s, s is encoded using a space time code matrix S, $s=\{s_1, s_2, s_3, \ldots s_T\}$, and T represents a number of data symbols received during a time t; and
a decoder, coupled to the receiver, to decode the received signal Y using pairs of encoded data symbols;
wherein the MIMO communication system is a 2×2 MIMO system and the space time code matrix S comprises:

$$S = \frac{1}{\sqrt{1+r^2}} \begin{pmatrix} s_1 + irs_4 & rs_2 + s_3 \\ s_2 - rs_3 & irs_1 + s_4 \end{pmatrix}; \text{ and}$$

$$r = \frac{-1+\sqrt{5}}{2}.$$

21. The system of claim 20 wherein the decode includes components to:
(a) identify one of the pairs $\{s_a, s_b\}$ of data symbols s from T/2 pairs from data symbols s, wherein $s_a \in \{s_1, s_2, s_3, \ldots s_T\}$ and $s_b \in \{s_1, s_2, s_3, \ldots s_T\}$;
(b) decode the identified pair $\{s_a, s_b\}$ of data symbols before decoding any remaining pair of data symbols s;
(c) remove a contribution of the decoded pair $\{s_a, s_b\}$ from Y; and
repeat steps (a) through (c) for remaining pairs of data symbols until all T/2 pairs from data symbols s are decoded.

22. The system of claim 21 wherein the components to identify one of the pairs $\{s_a, s_b\}$ of data symbols s further comprises components to identify one of the pairs $\{s_a, s_b\}$ of data symbols s having a highest signal-to-noise ratio from among the T/2 pairs.

23. The system of claim 21 further comprising:
a quantizer to quantize the decoded pair of data symbols to obtain the contribution in step (c).

24. The system of claim 20 wherein to decode the received signal Y further comprises components to determine a minimum mean-square estimation of the data symbols s.

25. A method for decoding space time codes in a wireless multiple input, multiple output (MIMO) communication system, the method comprising:
receiving a signal Y on r antennas, wherein r is an integer greater than one (1), wherein Y comprises a plurality of encoded data symbols s, s is encoded using a space time code matrix S, $s=\{s_1, s_2, s_3, \ldots s_T\}$, T represents a number of data symbols received during a time t, and Y=HS+N, wherein H represents a channel matrix and N represents interference;
(a) selecting a pair of data symbols to decode;
(b) decoding the selected pair of data symbols;
(c) removing a contribution of the decoded data symbols from the signal Y;
repeating steps (a), (b), and (c) for remaining pairs of symbols in the space time code matrix S; and
when T is odd, decoding a remaining symbol in the received signal Y;
wherein the MIMO communication system is a 2×2 MIMO system and the space time code matrix S comprises:

$$S = \frac{1}{\sqrt{1+r^2}} \begin{pmatrix} s_1 + irs_4 & rs_2 + s_3 \\ s_2 - rs_3 & irs_1 + s_4 \end{pmatrix}; \text{ and } r = \frac{-1 + \sqrt{5}}{2}.$$

26. The method of claim 25 wherein the channel matrix H is a biorthogonal, estimated channel matrix.

27. The method of claim 26 wherein the channel matrix H is a non-biorthogonal, estimated channel matrix, the method further comprising:
estimating the data symbols to generate pairs of data symbols, wherein error covariances of data symbols in a pair are approximately identical.

28. The method of claim 26 further comprising:
quantizing the decoded pair of data symbols to obtain the contribution in step (c).

* * * * *